United States Patent [19]

Bigus et al.

[11] Patent Number: 5,155,763
[45] Date of Patent: Oct. 13, 1992

[54] LOOK AHEAD METHOD AND APPARATUS FOR PREDICTIVE DIALING USING A NEURAL NETWORK

[75] Inventors: Joseph P. Bigus; Richard A. Diedrich, both of Rochester, Minn.; Charles E. Smith, Boca Raton, Fla.

[73] Assignee: International Business Machines Corp., Armonk, N.Y.

[21] Appl. No.: 626,670

[22] Filed: Dec. 11, 1990

[51] Int. Cl.[5] .................... H04M 1/26; H04M 1/72; H04M 3/46

[52] U.S. Cl. ................... 379/113; 379/309; 379/352; 379/133

[58] Field of Search ............ 379/113, 156, 157, 165, 379/308, 309, 352, 216, 133, 134

[56] References Cited

U.S. PATENT DOCUMENTS 4,858,120  8/1989  Samuelson .................... 379/309 X

OTHER PUBLICATIONS

Application System/400 Communications: Call-Path/400 Programmer's Reference Document No. GC21-9867-00, Nov. 26, 1990, IBM Rochester.

*Primary Examiner*—Stafford D. Schreyer

[57] ABSTRACT

A predictive dialing system having a computer connected to a telephone switch stores a group of call records in its internal storage. Each call record contains a group of input parameters, including the date, the time, and one or more workload factors. Workload factors can indicate the number of pending calls, the number of available operators, the average idle time, the connection delay, the completion rate, and the nuisance call rate, among other things. In the preferred embodiment, each call record also contains a dial action, which indicates whether a call was initiated or not. These call records are analyzed by a neutral network to determine a relationship between the input parameters and the dial action stored in each call record. This analysis is done as part of the training process for the neutral network. After this relationship is determined, the computer system sends a current group of input parameters to the neural network, and, based on the analysis of the previous call records, the neural network determines whether a call should be intiated or not. The neural network bases its decision on the complex relationship it has learned from its training data—perhaps several thousand call records spanning several days, months, or even years. The neural network is able to automatically adjust—in a look ahead, proactive manner—for slow and fast periods of the day, week, month, and year.

35 Claims, 24 Drawing Sheets

Neural Network Data Structure 50

| | Header Field Name | Length | Required |
|---|---|---|---|
| 61 | Pointer to Next Neural Network | 16 | N |
| 62 | Pointer to Next Neural Network | 16 | N |
| 63 | Offset to next free space | 4 | Y |
| 64 | Offset to end of space | 4 | Y |
| 65 | Network Name | 10 | Y |
| 66 | Network Library | 10 | Y |
| 67 | Network Version Identifier | 10 | Y |
| 79 | Network Model (Type) | 10 | Y |
| 68 | Network Status | 10 | Y |
| 69 | Network String | 10 | N |
| 70 | Network Training Time | 10 | Y |
| 71 | Network Boolean Parameters (4) | 4 | N |
| 72 | Network Size Parameters (5) | 20 | N |
| 73 | Network Index Parameters (5) | 20 | N |
| 74 | Network Training Parameters (6) | 24 | N |
| 75 | Network Training Cycle Counter | 4 | Y |
| 76 | Network Array Offsets (16) | 256 | Y |
| 77 | Network Array Pointers (16) | 24 | Y |
| 78 | Network Array Data Types (16) | 24 | Y |
| | Variable-Length Data Area | 0-16 Meg | Y |
| | Array 1 | | |
| | 2 | | |
| | . | | |
| | . | | |
| | 15 | | |
| | 16 | | |

```
            Create Neural Network (CRTNRLNET)

Type choices, press Enter.

Neural Network Name  . . . . . . .   NNPACER       Name
  Library  . . . . . . . . . . . .     BIGUS       Name, *CURLIB
Neural Network Type  . . . . . . .   *BKP          *BKP *ART *KMAP *TSP *BAM
Text 'description' . . . . . . . .   Neural Network Pacer for Predictive Dialing Bottom
F3=Exit  F4=Prompt  F5=Refresh  F12=Cancel  F13=How to use this display
F24=More keys
```

```
                Create BKP Neural Network (QNWCBKP)

Type choices, press Enter.

Neural Network Name . . . . . . > NNPACER      Name
  Library . . . . . . . . . .   >   BIGUS      Name, *CURLIB
Number of Input Units . . . . .      16        1-2000
Number of Hidden Units L1 . . .      35        0-500
Number of Hidden Units L2 . . .       0        0-500
Number of Output Units . . . .        1        1-1000
Text 'description' . . . . . . > 'Neural Network Pacer for Predictive Dialing'

Bottom
F3=Exit  F4=Prompt  F5=Refresh  F12=Cancel  F13=How to use this display
F24=More keys
```

FIG. 13

```
                Teach Neural Network (TCHNRLNET)

Type choices, press Enter.

Data Set . . . . . . . . . . . . .   NNDATA        Name
  Library  . . . . . . . . . . . .   BIGUS         Name, *LIBL, *CURLIB
Data Set Member  . . . . . . . . .   NNPACER       Name, *FIRST
Neural Network . . . . . . . . . .   NNPACER       Name
  Library  . . . . . . . . . . . .   BIGUS         Name, *LIBL, *CURLIB
Interface program  . . . . . . . .   NNCUSTOM      Name
  Library  . . . . . . . . . . . .   BIGUS         Name, *LIBL, *CURLIB
Patterns per cycle . . . . . . . .   10            1-99999
Input mode . . . . . . . . . . . .   *AUTO         *AUTO, *ENTER
Display data . . . . . . . . . . .   *NO           *YES, *NO
Log data . . . . . . . . . . . . .   *NO           *YES, *NO
Initialize network . . . . . . . .   *NO           *YES, *NO
Interactive environment  . . . . .   *YES          *YES, *NO Bottom
F3=Exit  F4=Prompt  F5=Refresh  F12=Cancel  F13=How to use this display
F24=More keys
```

```
Teach Neural Network Environment

Data Set  . . . . . . . . . . . :   NNDATA
  Library . . . . . . . . . . . :   BIGUS
  Member  . . . . . . . . . . . :   NNPACER Neural Network  . . . . . . . . :   NNPACER
  Library . . . . . . . . . . . :   BIGUS Interface program . . . . . . . :   NNCUSTOM
  Library . . . . . . . . . . . :   BIGUS Type choices, press Enter.

Log data  . . . . . . . . . . .   N      Y=YES, N=NO

F3=Exit  F9=Teach  F10=Save/Load Network  F12=Cancel (C) Copyright IBM Corp. 1990.
```

FIG. 14

```
                    Teach Neural Network

Network . . . . . . . . . :  NNPACER   Status . . . . . . . . . :  Training
Type . . . . . . . . . . . :  *BKP     Epochs . . . . . . . . . :         1

Network Training Parameters

Learn Rate . . . . . . . :  0.50000   Epoch update . . . . . . :  N
Momentum . . . . . . . . :  0.90000   Random inputs  . . . . . :  N
Pattern Error  . . . . . :  0.65163   Input Units  . . . . . . :        16
Epoch Error  . . . . . . :  0.51019   Hidden L1  . . . . . . . :        35
Tolerance  . . . . . . . :  0.10000   Hidden L2  . . . . . . . :         0
                                      Output Units . . . . . . :         1

Type choices, press Enter.

Patterns per cycle . . . . . . . :         10   1-99999
    Refresh rate . . . . . . . . . . :         10   1-99999

F3=Exit  F9=Change Parameters  F10=Display Array
F12=Cancel
```

FIG. 15

```
          Change Neural Network Parameters

Network . . . . . . . :  NNPACER   Type . . . . . . . . . . . :  *BKP

Type choices, press Enter.

Network Status . . . . . . . . . .   2         1=Initialize, 2=Training
                                                3=Locked
Learn rate . . . . . . . . . . . .      0.5000  0.0-10.0
Momentum . . . . . . . . . . . . .      0.9000  0.0-1.0
Tolerance  . . . . . . . . . . . .      0.1000  0.0-0.5

Epoch update . . . . . . . . . . .   N          Y=Yes, N=No
Random inputs  . . . . . . . . . .   N          Y=Yes, N=No F3=Exit  F5=Refresh  F12=Cancel
```

Neural Network Pacer

| Input Parameters | Range | Value | Action |
|---|---|---|---|
| Month | 01-12 | 09 | Dial Y |
| Day | 01-31 | 04 | |
| Year | 00-99 | 91 | |
| Day of Week | 1-7 | 3 | |
| Hour | 0-24 | 9 | |
| Min | 0-60 | 24 | |
| Sec | 0-60 | 15 | |
| | | | |
| Pending Calls | 0-1000 | 20 | |
| Avail Operators | 0-1000 | 6 | |
| Avg Connect Delay | 0-100 sec | 12 | |
| Avg Idle Time | 0-3600 sec | 240 | |
| Avg Nuisance Rate | 0-100 % | 240 | |
| Avg Completion Rate | 0-100 % | 32.3 | |
| Avg Convers. length | 0-3600 sec | 120 | |
| Idle Time Delta | -3600-+3600 | -35 | |
| Nuisance Call Delta | -100%-+100% | +0.4 | |

F3=Exit  F5=Refresh  F12=Cancel 5,155,763

LOOK AHEAD METHOD AND APPARATUS FOR PREDICTIVE DIALING USING A NEURAL NETWORK

FIELD OF THE INVENTION

This invention relates to the data processing field. More particularly, this invention is a look-ahead method and apparatus for predictive dialing using a neural network.

BACKGROUND OF THE INVENTION

Communications in the 1990s is considerably more complex that it used to be. Back in the stone age, when one Neanderthal wanted to communicate with another Neanderthal, he walked over to the second Neanderthal and grunted a few sounds. Gradually, communication evolved into written messages that could be delivered, first by messenger and later by mail.

Eventually, the telephone was invented. The telephone allowed a person to communicate with another person simply and efficiently by picking up the receiver and dialing the telephone number of the person he wished to speak to.

Salespeople were on a similar evolutionary track. When a salesman wanted to sell something to another person, he went door to door and tried to convince whoever was there that they should buy what the salesman was selling. When this proved to be inefficient due to the high number of doors slammed in the salesman's face, the salesman began mailing letters, brochures, and other written promotional materials to prospective customers. This was also inefficient, since a very high percentage of these mailings were considered to be "junk mail" by the recipients. Only a small percentage of the mailings resulted in sales.

It didn't take long for salespeople to discover the telephone. A salesman could quickly and inexpensively call a prospective customer and explain what he was selling. Since most calls ended quickly (with the potential customer expressing his lack of interest in a variety of ways and then hanging up) the bulk of the time was spent figuring out who was going to be called and trying to establish a connection with that person. The phone would often be busy or not answered, forcing the salesman to try again later and look for another prospective customer to call.

Salespeople began to realize that this approach was also inefficient. They discovered that computers could quickly perform much of the overhead involved with establishing connections with prospective customers. When a salesperson (now known as a "telemarketer") completed a call, he could instruct the computer to dial the next number from a list of numbers stored in the computer. This became known as outbound telemarketing.

Although very efficient, conventional outbound telemarketing still had problems. Much of the telemarketer's time was spent listening to busy signals or phones that weren't answered. In addition, telemarketers often grew weary of a high degree of rejection, and were reluctant to instruct the computer that they were ready to make another call. To solve these problems, predictive dialing was developed. In a typical predictive dialing arrangement, the potential customer is called by the computer. If someone answers the phone, the computer finds an available telemarketer and connects the call to this telemarketer.

While prior attempts in the predictive dialing field have been very good at the "dialing" part of predictive dialing, they have not been good at the "predicting" part. Often, the computer makes and completes a call to a customer, only to discover that there isn't an operator available to take the call. This is known as a "nuisance call". The customer then is subjected to a recorded announcement, a ringing signal, dead silence or a hang up. The opposite problem of having operators sitting idle waiting for the computer to dial a customer also frequently occurs in prior attempts. This is known as "operator idle time".

U.S. Pat. No. 4,829,563 to Crockett et al attempted to solve these problems of nuisance calls and operator idle time by dynamically adjusting the number of calls dialed based on short term comparisons of the weighted predicted number of calls versus the predicted number of operators, and based on periodic adjustment of a weighting factor. Crockett's "short term" comparisons are always "reactive" in nature—changes are made only after nuisance calls or operator idle time rise to unacceptable levels. Therefore, Crockett's "reactive dialing" approach falls short of solving the above-identified problems of nuisance calls and operator idle time.

SUMMARY OF THE INVENTION

It is a principle object of the invention to provide an efficient predictive dialing technique.

It is another object of the invention to provide a predictive dialing technique that maintains nuisance calls and operator idle time within acceptable levels.

It is another object of the invention to provide a predictive dialing technique able to look ahead and anticipate changes in calling patterns and adjust accordingly, before nuisance calls or operator idle time rise to unacceptable levels.

It is another object of the invention to use a neural network in a predictive dialing technique that is able to look ahead and anticipate changes in calling patterns and adjust accordingly, before nuisance calls or operator idle time reach unacceptable levels, based on what the neural network has learned.

These and other objects are accomplished by the look-ahead method and apparatus for predictive dialing using a neural network disclosed herein.

A predictive dialing system having a computer connected to a telephone switch stores a group of call records in its internal storage. Each call record contains a group of input parameters, including the date, the time, and one or more workload factor parameters. Workload factor parameters can indicate the number of pending calls, the number of available operators, the average idle time, the connection delay, the completion rate, the conversation length and the nuisance call rate, among other things. In the preferred embodiment, each call record also contains a dial action, which indicates whether a call was initiated or not.

These call records are analyzed by a neural network to determine a relationship between the input parameters and the dial action stored in each call record. This analysis is done as part of the training process for the neural network. After this relationship is determined, the computer system sends a current group of input parameters to the neural network, and, based on the analysis of the previous call records, the neural network determines whether a call should be initiated or not.

The neural network bases its decision on the complex relationship it has learned from its training data —perhaps several thousand call records spanning several days, months, or even years. The neural network is able to automatically adjust—in a look ahead, proactive manner—for slow and fast periods of the day, week, month, and year.

BRIEF DESCRIPTION OF THE DRAWING

FIG. 4 shows the neural network data structure of the invention.

FIGS. 11-17 show screens displayed to a user creating, training, and running the predictive dialing neural network of the invention.

RELATED PATENT APPLICATION

This patent application is related to commonly assigned U.S. patent application Ser. No. 07/482,450, filed Feb. 2, 1990, incorporated herein by reference.

DESCRIPTION OF THE PREFERRED EMBODIMENT

Figure 1:
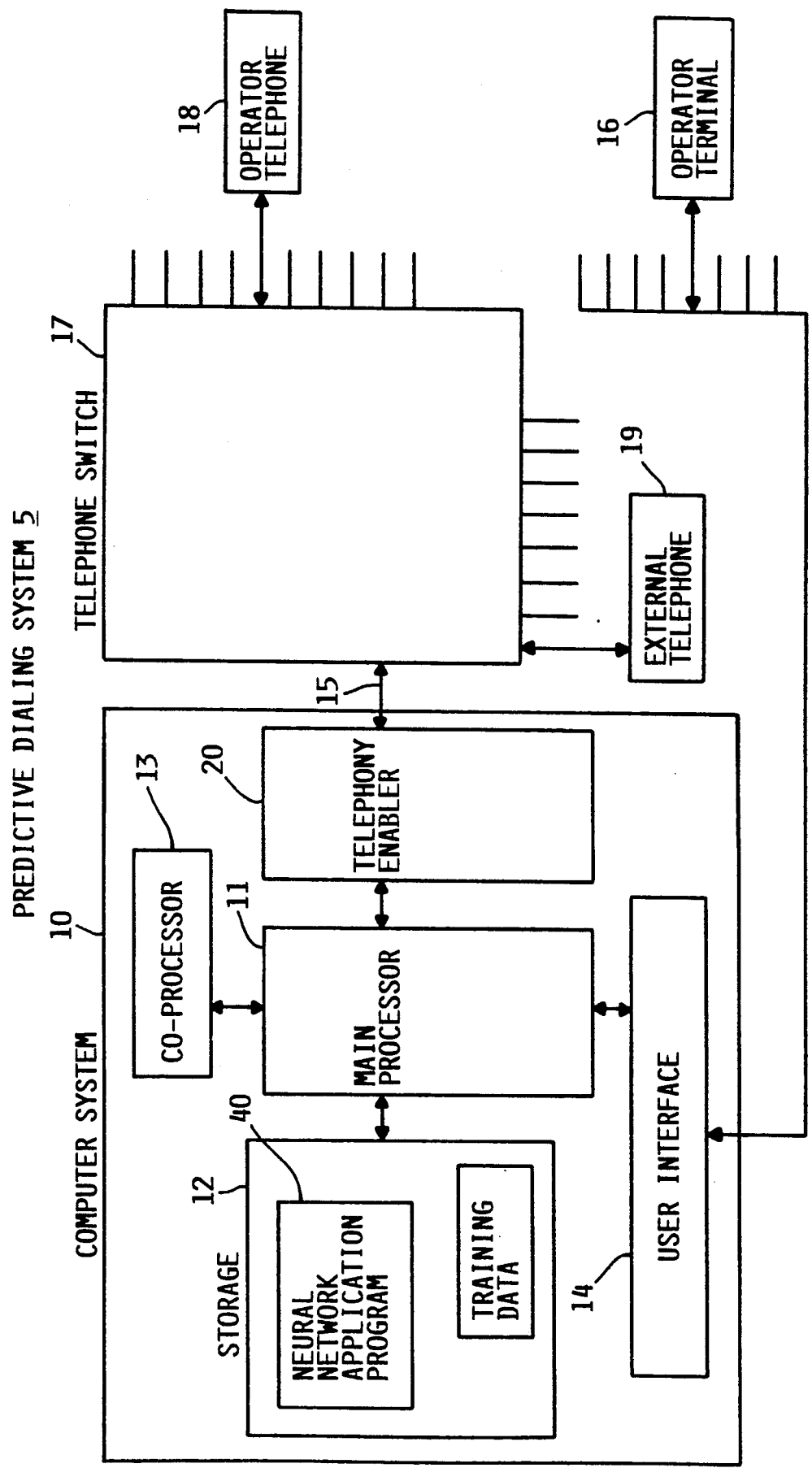
FIG. 1 shows a block diagram of the predictive dialing system of the invention.

FIG. 1 shows a block diagram of predictive dialing system 5 of the invention. Computer system 10 consists of main or central processing unit 11 connected to storage 12. Storage 12 can be primary memory such as RAM and/or secondary memory such as magnetic or optical storage. Processor 11 is connected to co-processor 13. Co-processor 13 may provide generic math calculation functions (a math co-processor) or specialized neural network hardware support functions (a neural network processor). Co-processor 13 is not necessary if CPU 11 has sufficient processing power to handle an intensive computational workload without unacceptable performance degradation. CPU 11 is also connected to user interface 14. User interface 14 allows developers and users to communicate with computer system 10, normally through a workstation or terminal.

In the preferred embodiment, computer system 10 is an IBM Application System/400 midrange computer, although any computer system could be used. Co-processor 13 is preferably a processor on the Application System/400 midrange computer, but could also be the math co-processor (such as an Intel 80387 math co-processor) found on personal computers, such as the IBM PS/2. In this case, CPU 11 and co-processor 13 would communicate with each other via IBM PC Support.

Computer system 10 is connected to telephone switch 17 over line 15 through telephony enabler 20. In the preferred embodiment, telephony enabler 20 is the IBM licensed program product CallPath/400, although other commercially available telephony enablers could be used. In the preferred embodiment, telephone switch 17 is a Teleos IRX9000, although any other switch capable of interfacing with a computer and supporting a predictive dialing application may be used. Switch 17 is able to establish connections between an external telephone, such as external telephone 19, with an operator telephone, such as operator telephone 18, in a conventional manner under the direction of computer system 10. Computer system 10 also communicates with a plurality of operator terminals, such as operator terminal 16, via user interface 14. Data associated with the calls made by predictive dialing system 5 (such as a script or information about the called party) may be displayed on operator terminal 16.

Figure 2:
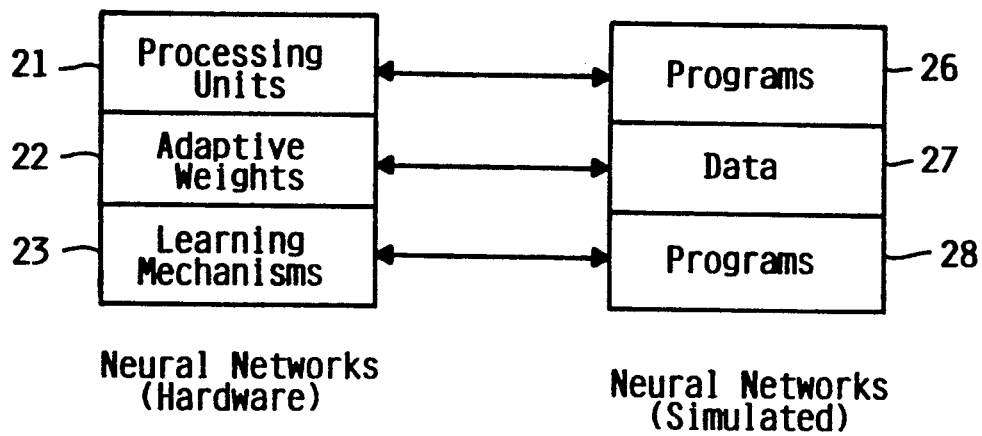
FIG. 2 shows how a massively parallel hardware implemented neural network can be simulated on a serial Von Neumann based computer system.

FIG. 2 shows how neural network (parallel) computers can be simulated on a Von Neumann (serial) processor system. There are many different neural network models with different connection topologies and processing unit attributes. However, they can be generally classified as computing systems which are made of many (tens, hundreds, or thousands) simple processing units 21 which are connected by adaptive (changeable) weights 22. In addition to processors and weights, a neural network model must have a learning mechanism 23, which operates by updating the weights after each training iteration.

A neural network model can be simulated on a digital computer by programs and data. Programs 26 simulate the processing functions performed by neural network processing units 21, and adaptive connection weights 22 are contained in data 27. Programs 28 are used to implement the learning or connection weight adaptation mechanism 23.

Figure 3A:
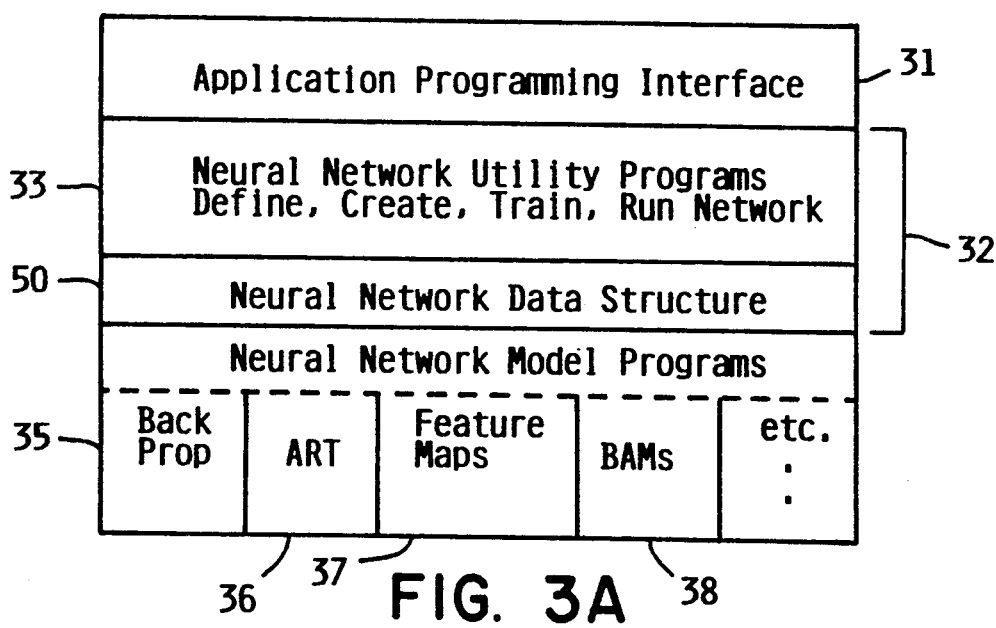
FIGS. 3A-3B shows a conceptual framework of the computing environment of the invention.

FIG. 3A shows the conceptual layout of the neural network of this invention and how it relates to the predictive dialing application software. At the highest level is application programming interface 31 (API). API 31 is a formally specified interface which allows application developers lacking expert knowledge of neural networks to access and use the utility programs and data structure of neural network shell 32 in their application programs.

Neural network shell 32 consists of a set of utility programs 33 and a neural network data structure 50. Shell 32 provides the capability for easily and efficiently defining, creating, training, and running neural networks in applications on conventional computing systems.

Any neural network model, such as example models 35-38, can be supported by neural network shell 32 by defining a generic neural network data structure 50 which can be accessed by all of the utility programs in neural network shell 32. Each neural network model is mapped onto this generic neural network data structure, described in more detail in FIG. 4. Programs specific to each neural network model are called by neural network utility programs 33, as will be discussed later.

Figure 3B:
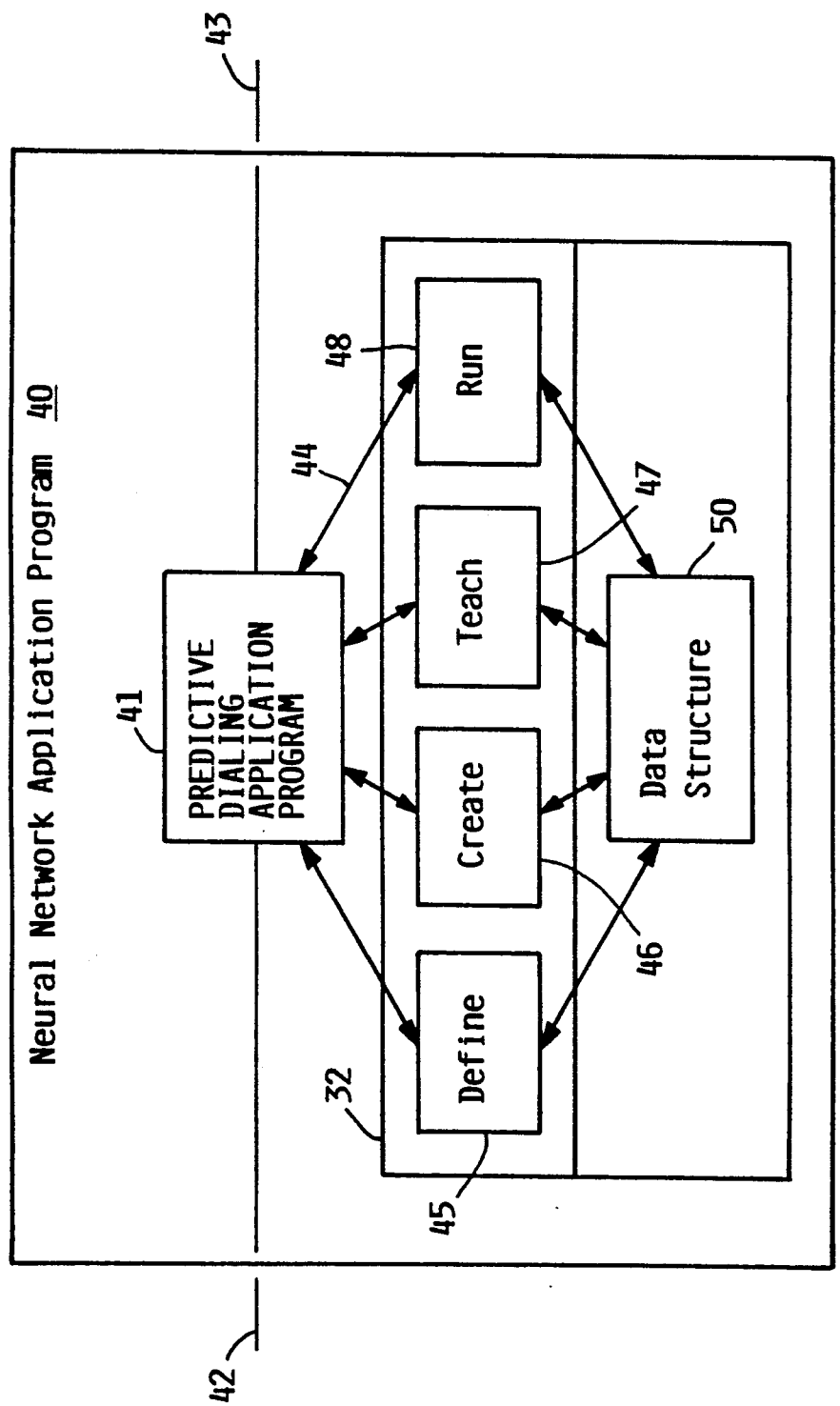

FIG. 3B shows how predictive dialing application program 41 becomes neural network application program 40 by interfacing with one or more of the neural network utility programs 45-48 in neural network shell 32. Utility programs 45-48 in turn interface with data structure 50. Data to be processed by neural network application program 40 (also referred to herein as "neural network") enters on input 42. After the data is run through the neural network, the result is returned to application program 41 on line 44. Application program 41 and utility programs 46-48 reside in suitably programmed CPU 11 and/or co-processor 13 (FIG. 1). Data structure 50 resides in storage 12 and/or in internal storage of CPU 11 and/or co-processor 13.

FIG. 4 shows neural network data structure 50 of the invention. Data structure 50 provides a common framework which allows any neural network model to be defined for use in an application program. This common framework is accomplished by providing several of the fields in neural network data structure 50 for model specific parameters. Pages 103-105 of the attached Appendix I, entitled "AS/400 Neural Network Utility: User's Guide and Reference PRPQ P84189" (order number SC21-8202-0) shows how the model specific fields of data structure 50 are used by the Back Propagation, ART, Self Organizing Feature Map, TSP, and BAM neural network models.

Data structure 50 consists of header portion 60 and body portion 90. Header portion 60 contains fields 61-79. Fields 61 and 62 are pointers to other neural network data structures, if any. If neural networks are arranged in a linked list for serial processing of data, the first pointer would link to the previous network. This link can be used to obtain the outputs from the previous sub-net in the larger network. The second pointer would be a pointer to the next network. Depending on the collection of sub-networks, either or both of these links would be used in a complex (hybrid) network composed of several sub-networks.

Neural network data structures can be chained together to provide increased flexibility and function to the application program. Providing the capability of linking to two additional neural networks allows "super" networks made up of modules of networks.

Field 63 is an offset in bytes to the next free space in body portion 90. Field 64 is an offset in bytes to end of the neural network data structure. Since body portion 90 is a variable length data area, fields 63 and 64 are needed to keep track of the size of the data structure and the next available free space in body portion 90.

Field 65 contains the name of the neural network. The name of the predictive dialing neural network, discussed in more detail later, will be entered into this field. The name of this network is NNPACER, and this name is placed in field 65 by the create neural network utility program, as will be discussed later.

Field 66 contains the name of the library where the neural network is located and is required in the preferred embodiment. In the AS/400, programs are stored in libraries. Libraries are similar to sub directories in the personal computing environment. Field 66 would not be necessary in computing environments without libraries. Field 67 contains the network version identifier. This information is used to prevent mismatches between neural network shell programs and neural network data structures. As new versions or releases of software are developed, compatibility with existing networks is desirable. If any enhancements require changes to the fundamental network data structure, this field would allow detection of a software-to-data mismatch. The software could call a conversion routine to update the data structure format, or accept down-level data structures.

Field 79 contains the name of the neural network model or type. The neural network model name used in the preferred embodiment by the predictive dialing neural network is "*BKP" for Back Propagation.

Field 68 contains the current state of the network. Possible states are 'INITIALIZE' if the network is being created, 'TRAINING' if the network is being trained, or 'LOCKED' if the training is complete and ready to run.

Field 69 is an optional field for storing a model specific alphanumeric field, if desired. Field 70 keeps track of the elapsed network training time in seconds.

Fields 71-74 contain different types of parameters used differently by specific neural network models. Field 71 contains up to four network Boolean parameters. A Back Propagation neural network model, for example, uses two of these parameters for determining whether epoch update and random input is enabled or disabled. The network Boolean parameters are also known as network flags. Of course, field 71 (as well as other fields of data structure 50) could be made larger or smaller to accommodate fewer or greater than the number of parameters used in the preferred embodiment, if desired. Field 72 contains network size parameters. This field contains up to five model-specific network size integer parameters. Field 73 contains up to five model-specific network index integer parameters. Field 74 contains up to six model-specific network training real parameters, such as learn rate, momentum, epoch error, etc.

Field 75 keeps track of the number of training epochs (an epoch is an iteration through the complete set of training data) of the neural network. Field 76 contains an array of offsets in bytes to the start of each model-specific array in body portion 90. Field 77 contains an array of resolved pointers to the start of each model-specific array in body portion 90. Field 78 contains an array of parameters describing the type of data held in each array. For example, some neural models accept only binary inputs. In the preferred embodiment, if a parameter in field 78 contains a "1" then its corresponding array contains bitmapped data. If the parameter is a "2" then its corresponding array contains single precision floating point data (the default). If it is "3" then its corresponding array contains fixed point zoned decimal data. These parameters are used to make more efficient use of storage.

The contents of body portion 90 of data structure 50 will now be discussed. Body portion 90 is a variable-length data area which contains a number (sixteen in the preferred embodiment) of model-specific arrays. Pages 103-105 of Attachment I shows the arrays mapped to header portion 60 and body portion 90 for each of the exemplary neural network models. For example, the back propagation model maps eleven arrays to body portion 90: activations, weights, threshold, weight deltas, etc, as shown under the heading "Array Mapping" on page 103.

Figure 7A:
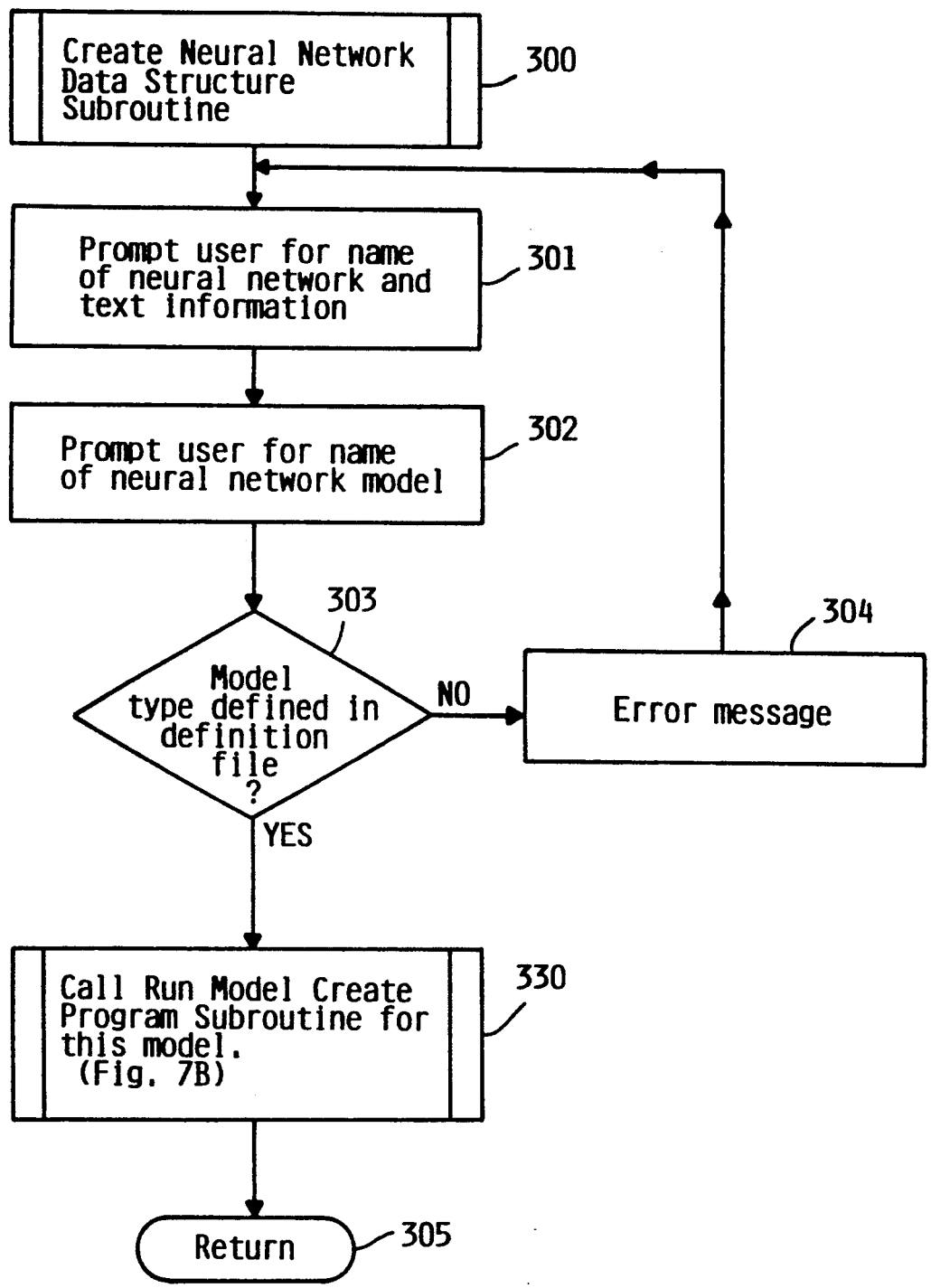
Figure 7B:
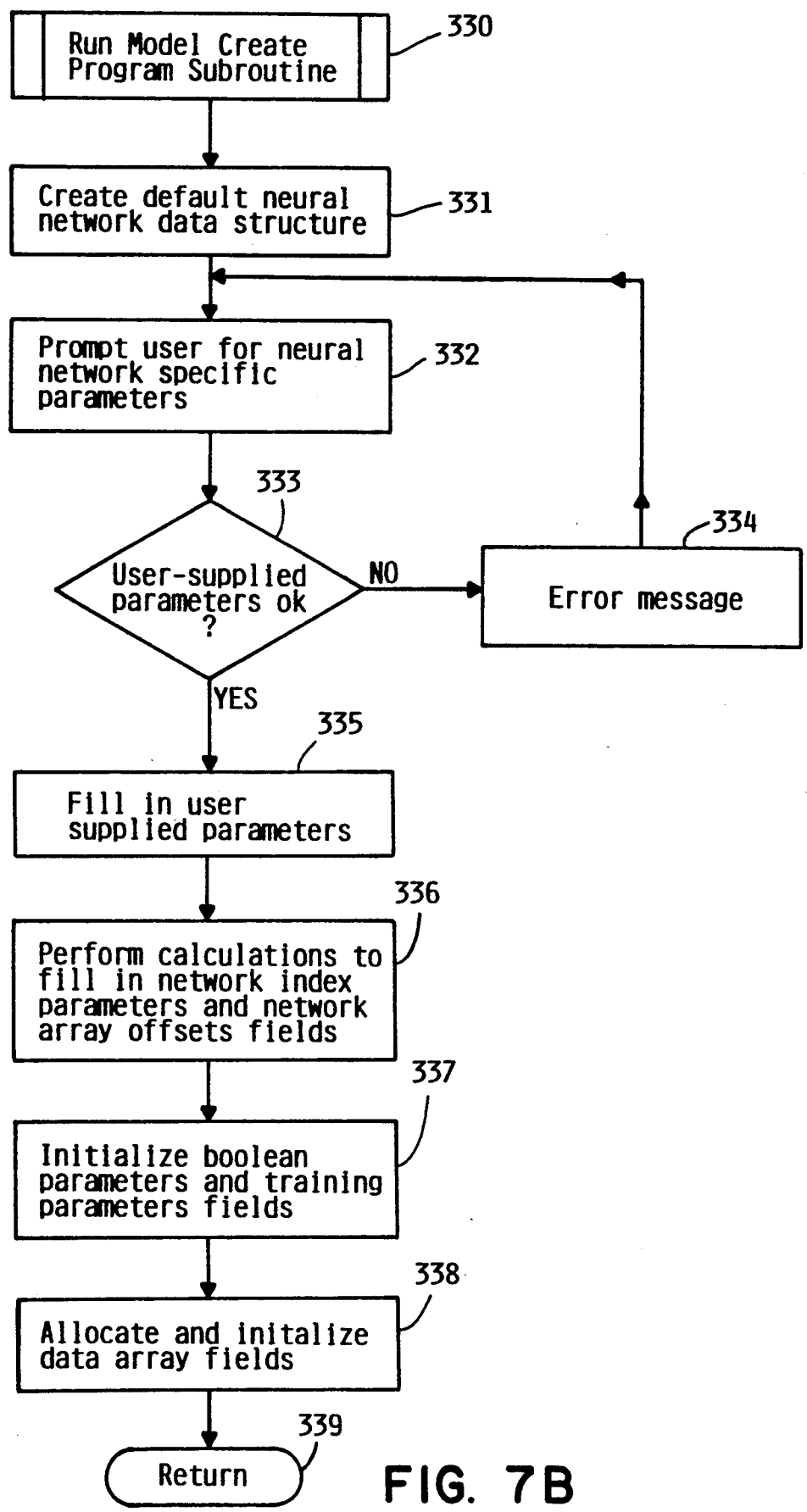

Data structure 50 is created by the Create Neural Network utility program, as will be discussed later (FIGS. 7A-7B). The Teach and Run utility programs access the header information to initialize the pointers to the data area arrays. The data in the data area arrays in turn are used in the simulation of the neural network training and calculation processes.

Figure 5:
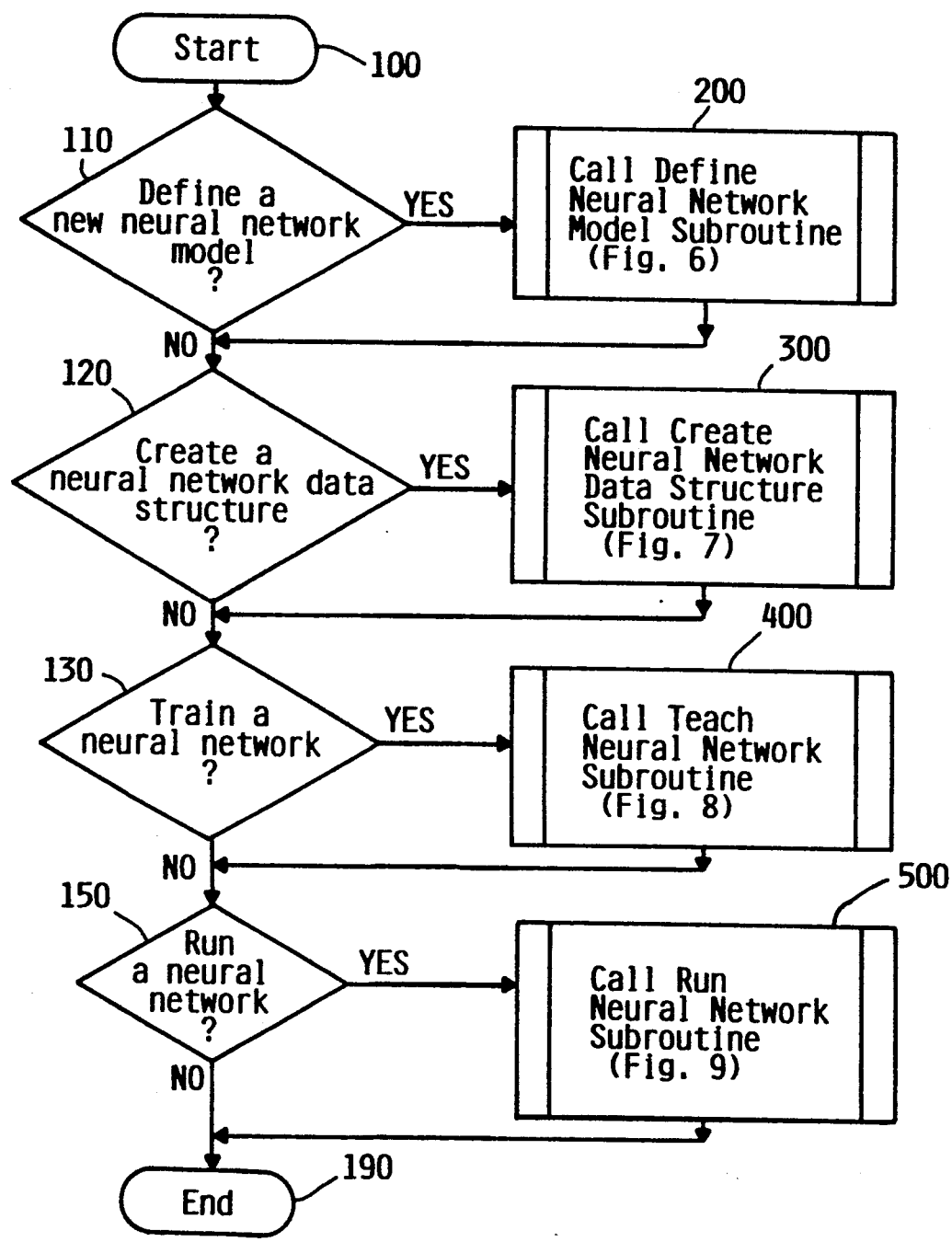
FIGS. 5-9 show the flowcharts of the neural network utility of the invention.
Figure 8A:
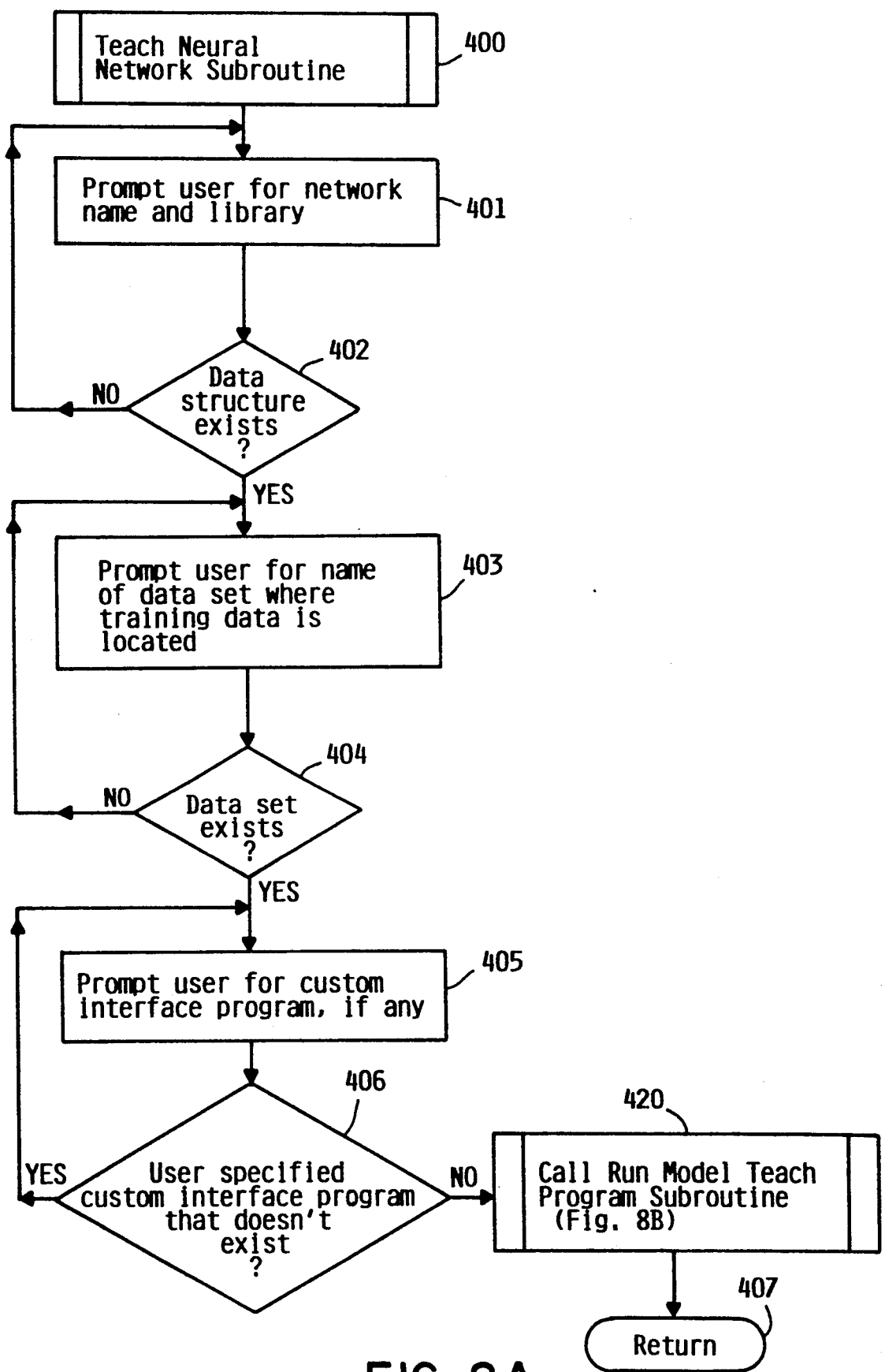
Figure 8B:
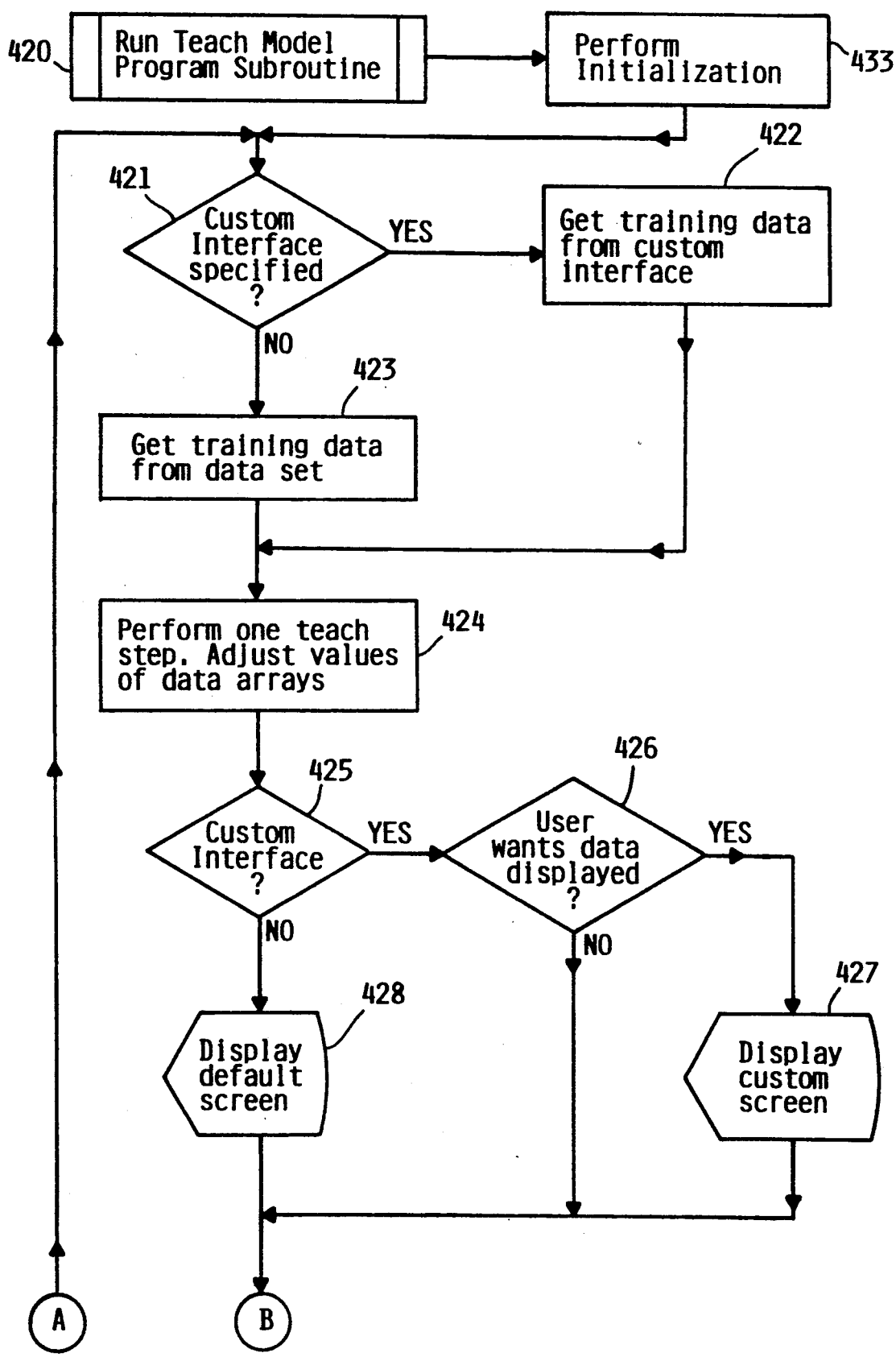
Figure 8C:
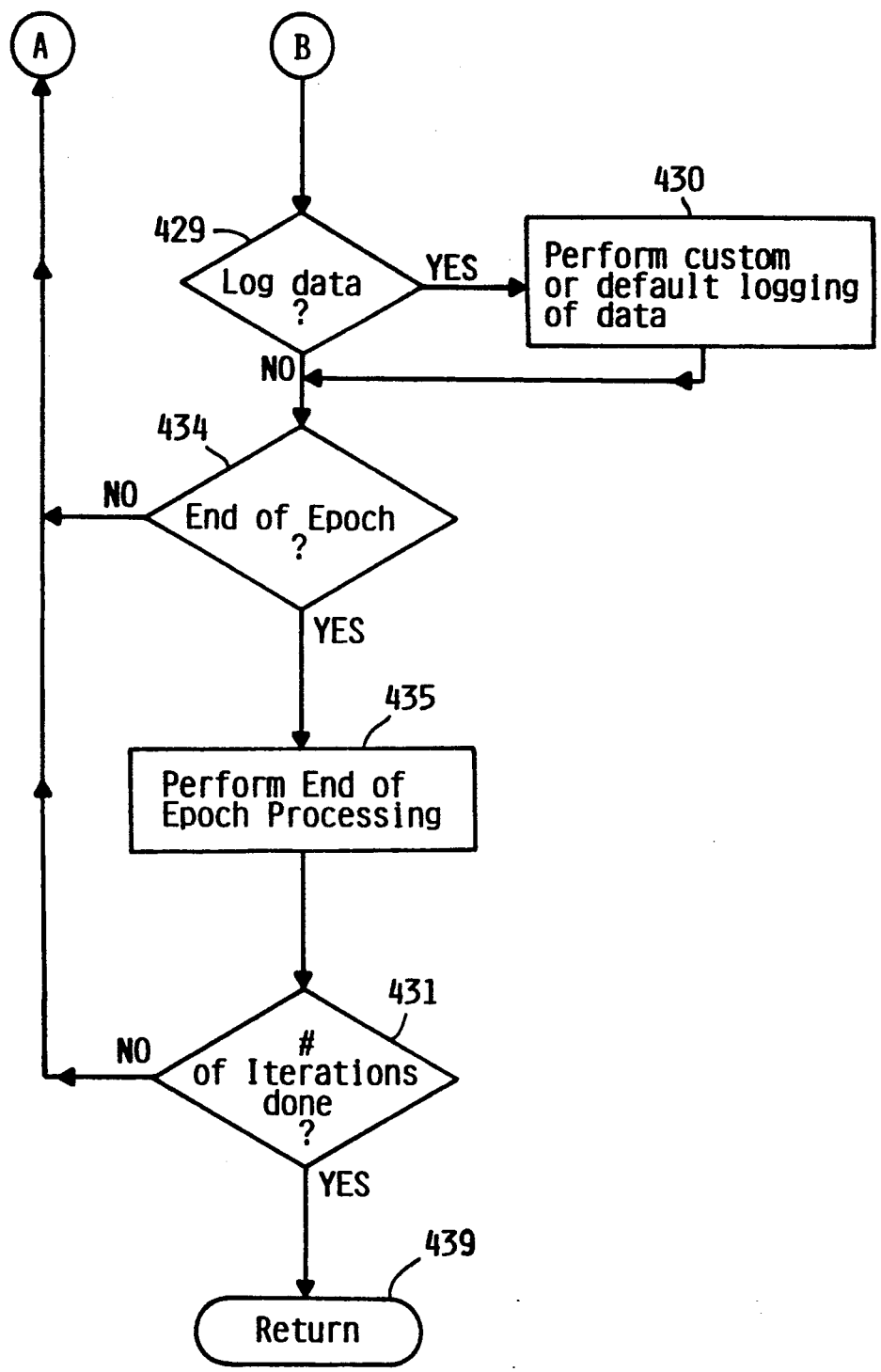

FIGS. 5-9 show the flowcharts of the invention, as performed by suitably programmed CPU 11 and/or co-processor 13. FIG. 5 shows an overview of the major steps in the neural network application program development process. Block 110 asks if there is a new neural network model to be defined. If so, block 200 calls the Define Neural Network Model Subroutine (FIG. 6). If not, block 120 asks if the user wishes to create a neural network data structure. A neural network data structure is created for each neural network. For example, one neural network data structure would be created for our predictive dialing neural network. If block 120 is answered affirmatively, block 300 calls the Create Neural Network Data Structure Subroutine (FIG. 7). If not, block 130 asks if the user wishes to train a neural network. A neural network needs to be trained with training data so that it can learn the relationship between input data and the desired output result, or extract relevant features from input data. If so, block 400 calls the Teach Neural Network Subroutine (FIG. 8). If not, block 140 asks if the user wants to run a neural network. If so, block 500 calls the Run Neural Network Model Subroutine (FIG. 9). If not, the program ends in block 190.

FIGS. 6A-6D describe Define Neural Network Model Subroutine 200. For our predictive dialing neural network we want to define a Back Propagation neural network model. Block 201 assigns a neural network model specific meaning to network string field 69, if desired. In our network, this field is not needed, so a null string is assigned. Block 202 assigns a neural network model specific meaning to Boolean parameters field 71. In our network, two Boolean parameters are assigned: Epoch update (Y/N) and Random Inputs (Y/N). Block 203 assigns a neural network model specific meaning to network size parameters field 72. In our network, five parameters are assigned: number of inputs, number of units in hidden layer 1, number of units in hidden layer 2, number of outputs, and number of processing units. Block 204 assigns a neural network model specific meaning to network index parameters field 13. In our network, the following parameters are assigned: first hidden unit 1, last hidden unit 1, first hidden unit 2, last hidden unit 2, and first output. Block 205 assigns a neural network model specific meaning to network training parameters field 74. In our network, the following parameters are assigned: learn rate, momentum, pattern error, epoch error, and tolerance. Block 206 assigns a neural network model specific meaning to network array offsets field 76. Since there are eleven data arrays to be defined in a Back Propagation neural network model, this field contains the byte offset to the first element of each of the eleven arrays located in body portion 90.

Figure 6A:
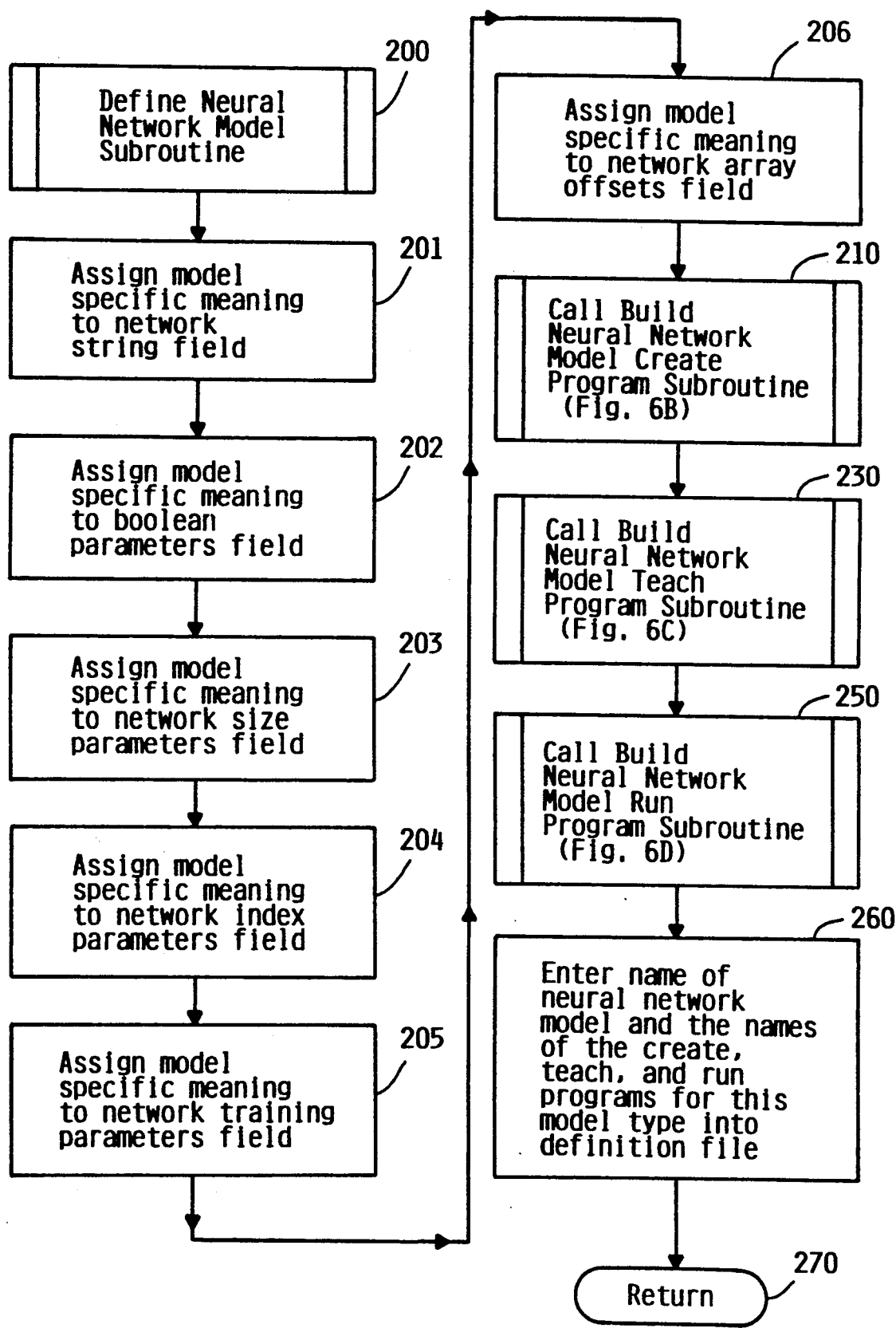
Figure 6B:
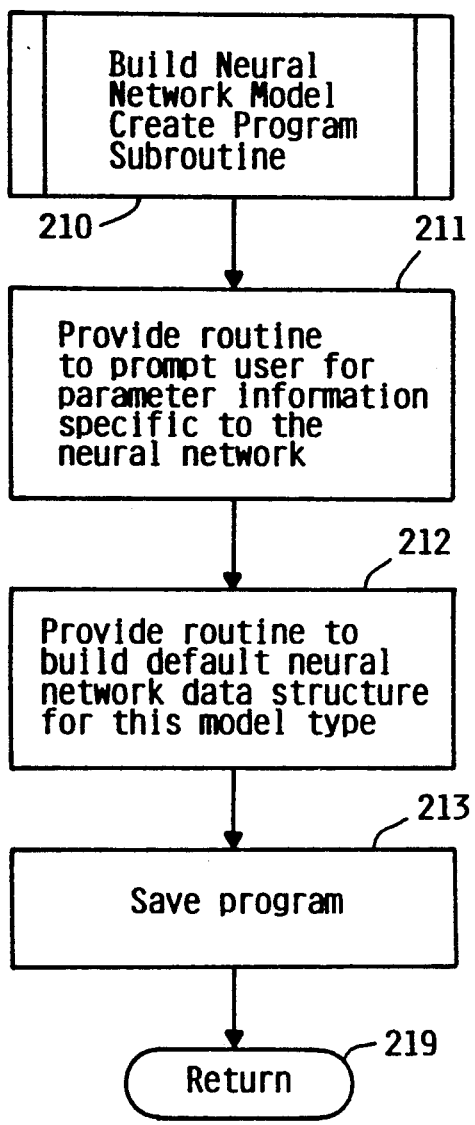

Block 210 calls the Build Neural Network Model Create Program Subroutine of FIG. 6B. Referring now to FIG. 6B, subroutine 210 requires that model specific routines are built so that they can be executed later by the Create Neural Network Data Structure Subroutine (FIG. 7). Block 211 provides a simple routine to prompt the user for parameter information specific to the neural network and check for erroneous and inconsistent parameter values. For example, block 211 would provide a routine that would prepare a screen similar to FIG. 12. The screen in FIG. 12, among other things, prompts the user for information about the following parameters: Number of input units, number of hidden units L1, number of hidden units L2, and number of output units.

Block 212 provides a routine to initialize the generic neural network data structure with default parameter values to create the default neural network data structure for this neural network model. All neural network models have the same generic neural network data structure. Each individual neural network model has its own unique default data structure. Therefore, all neural networks application programs that use the same neural network model (such as Back Propagation) will input unique parameter values into the same default neural network data structure.

Block 213 saves the neural network model create program built in subroutine 210 by giving it a unique name and writing it to storage 12 (FIG. 1). In the preferred embodiment, this program can be written in any language desired which has the capability to access the data structure. Block 219 returns to block 230 of FIG. 6A.

Figure 6C:
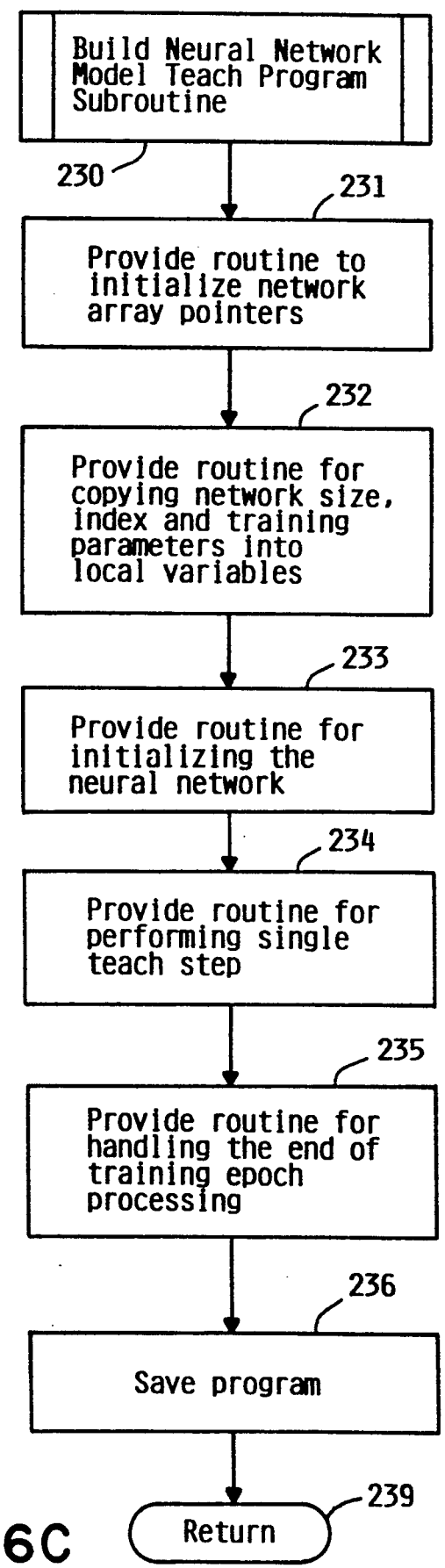

Block 230 calls the Build Neural Network Model Teach Program Subroutine of FIG. 6C. Referring now to FIG. 6C, subroutine 230 requires that model specific routines are written so that they can be executed later by the Teach Neural Network Subroutine (FIG. 8). Block 231 provides a simple routine to initialize the network array pointers in field 77 of FIG. 4. Block 232 provides a routine for copying network size, index and training parameters (fields 72-74) into local variables. This is done to improve performance and programming reliability. Block 233 provides a routine to initialize the neural network. Block 233 initializes counters and variables used by the neural network teach program. If network status field 68 is "Initialize", block 233 also initializes data array values (connection weights) and changes the status from "Initialize" to "Training" in field 68.

Block 234 provides a routine to perform a single teach step for this neural network model. This routine provides a mechanism, highly dependent on the neural network model, used to adjust the values of the data in the data array of body 90 so that the network can learn the desired functions. Those skilled in the art would take a neural network model description of its weight adjustment procedures (like those found in scholarly articles referenced in Appendix I on pages viii and ix) and simply convert this description to a program, using a computer language of their choice, that accesses the data structure of the invention.

Block 235 provides a routine to be performed when the training epoch processing has been completed. This routine can vary in complexity from a simple clean up procedure such as resetting variables to a more complex adjustment of data array values, depending on the neural network model. Those skilled in the art would take a neural network model description of its unique end of epoch processing and simply convert this description to a program, using a computer language of their choice, that accesses the data structure of the invention.

Block 236 saves the neural network model teach program built in subroutine 230 by giving it a unique name and writing it to storage 12 (FIG. 1). Block 239 returns to block 250 of FIG. 6A.

Figure 6D:
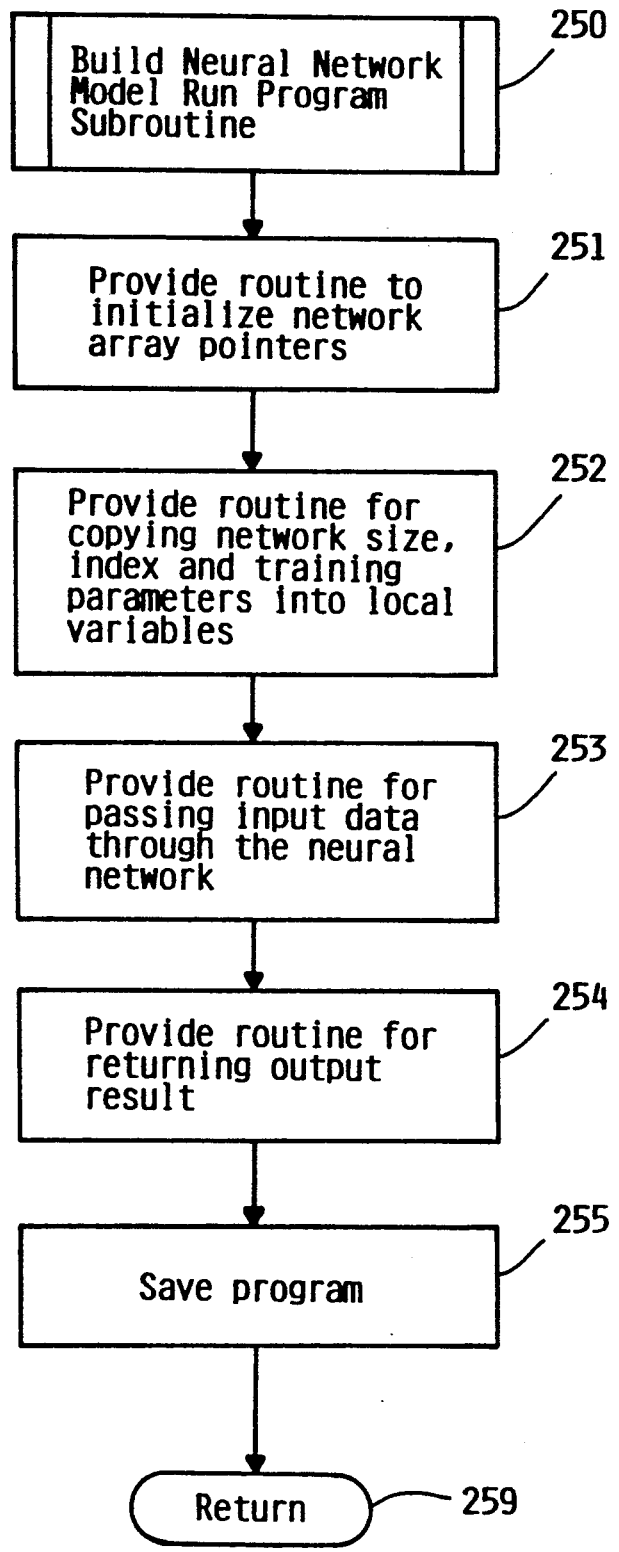

Block 250 calls the Build Neural Network Model Run Program Subroutine of FIG. 6D. Referring now to FIG. 6D, subroutine 250 requires that model specific routines are written so that they can be executed later by the Run Neural Network Subroutine (FIG. 8). Block 251 provides a simple routine to initialize the network array pointers in field 77 of FIG. 4. Block 252 provides a routine for copying network size, index and training parameters (fields 72-74) into local variables. Block 253 provides a routine to pass input data through the neural network. Block 254 provides a routine to return the output result to the Run Neural Network Subroutine. Block 255 saves the neural network model run program built in subroutine 250 by giving it a unique name and writing it to storage 12 (FIG. 1). Block 259 returns to block 260 of FIG. 6A.

Block 260 enters the name of the neural network model (such as "*BKP" for back propagation) and the names of the create, teach, and run programs for this model saved in blocks 213, 236, and 255 into a model definition file stored in storage 12. Block 270 returns to block 120 of FIG. 5.

In the preferred embodiment, five neural network models are predefined for the convenience of the application developer or user. The predefined models are Back Propagation, Adaptive Resonance Theory, Self Organizing Feature Maps, Self Organizing TSP Networks, and Bidirectional Associative Memories. Therefore, these models do not have to be defined by the user using the Define Neural Network Model Subroutine. The predictive dialing application program of the invention uses the predefined Back Propagation model as its neural network model, although other models could also be used.

The remaining flowcharts will be discussed in conjunction with the predictive dialing neural network of the invention. The user creates this neural network by answering block 120 affirmatively in FIG. 5 and calling the Create Neural Network Data Structure Subroutine in block 300 (FIG. 7). Referring now to FIG. 7A, block 301 prompts the user for the name of the neural network and textual description information, as shown in FIG. 11. The user enters "NNPACER" as the name of the neural network and "Neural Network Pacer for Predictive Dialing" for the textual description. Block 302 prompts the user for the name of the neural network model. As shown in FIG. 11, the user enters "*BKP", an abbreviation for the Back Propagation neural network model. Block 303 checks to see if the model "*BKP" was defined in the model definition file in block 260 of FIG. 6A. If not, block 304 posts an error message and the user is asked to reenter the name of the neural network model in block 301. In our network, the model definition file contains the "*BKP" and block 330 calls the Run Model Create Program Subroutine for this model of FIG. 7B. The Model Create Program was prepared by the Build Model Create Program Subroutine of FIG. 6B, as has been discussed. The name of this program, along with the names of the Teach and Run programs for this model, are all contained in the model definition file.

Referring now to FIG. 7B, block 331 creates the default neural network data structure for this neural network model, by running the routine provided in block 212 of FIG. 6B. Block 332 prompts the user for neural network specific parameters, as shown in FIG. 12. In the preferred embodiment, the user specifies 16 input units (one each for month, day, year, day of week, hour, minute, second, pending calls, available operators, average connect delay, average idle time, nuisance call rate, average completion rate, average conversation length, idle time delta and nuisance call delta), 35 hidden units and 1 output unit (call action). In the preferred embodiment, the number of hidden units is equal to 2 * (number of inputs + number of outputs) + 1. Block 333 checks to see if the user supplied parameters are acceptable. Note that the routine provided by block 211 in FIG. 6B to prompt the user for these parameters placed limits on the user's input, such as 1-1000 output units. If the user inputs a value outside of any of these ranges, block 333 would be answered negatively, an error message would be posted in block 334, and the user would be asked to reenter the data in block 332. In addition, if the user inputs inconsistent parameter information, an error message would also be posted. In our case, the user supplied parameters are all acceptable, so block 335 fills in all user supplied parameters into the default data structure created by block 331. Block 336 performs calculations to fill in network index parameters field 73 and network array offsets field 76, based on the data now residing in the data structure. Block 337 initializes the Boolean parameters in field 71 (both to "N" in our example) and the training parameters in field 74 (to the values shown in FIG. 15 in our example) Block 338 allocates and initializes the data array fields located in body portion 90. In a back propagation neural network model, the following arrays would be allocated: activations, weights, threshold, weight deltas, threshold deltas, teach, error, delta, network input, weight derivative, and threshold derivative. These values are all initialized (as determined by the neural network model) in block 338. After block 338 is executed, the neural network data structure contains all the information needed to teach the neural network how to perform predictive dialing. The subroutine returns in block 339 to block 305 in FIG. 7A. Block 305 returns to block 130 in FIG. 5.

Note that once a neural network data structure has been created, it can be transported to another computer system to be taught and/or run. The other computer system can be of an entirely different architecture and run an entirely different operating system than the computer system that created the neural network data structure. This flexibility is possible since the data structure contains data that can be used universally among different computer systems.

Since our user wants to train his newly created neural network to perform predictive dialing, he answers block 130 affirmatively in FIG. 5, thereby calling the Teach Neural Network Subroutine in block 400 (FIG. 8). Referring now to FIG. 8A, block 401 prompts the user for the name of the neural network and library as shown in FIG. 14. The user enters "NNPACER" as the name of the neural network, "BIGUS" as the library name. FIG. 14 also gives the user the opportunity to enter in the name of a custom interface program he can write to improve the usability of his particular neural network, if desired. In addition, the user is asked if he wants the training results to be logged or displayed, and (if a custom interface program exists) whether he wants the training data taken automatically from the data set or one step at a time from the user when he presses the enter key. Block 402 sees if the data structure specified in block 401 exists. If not, an error is posted and the user is returned to block 401. If so, block 403 prompts the user for the name of the data set where the training data is located, As shown in FIG. 13, the user enters "NNDATA" as the data set and "NNPACER" as the data set member where the training data is located.

Figure 10B:
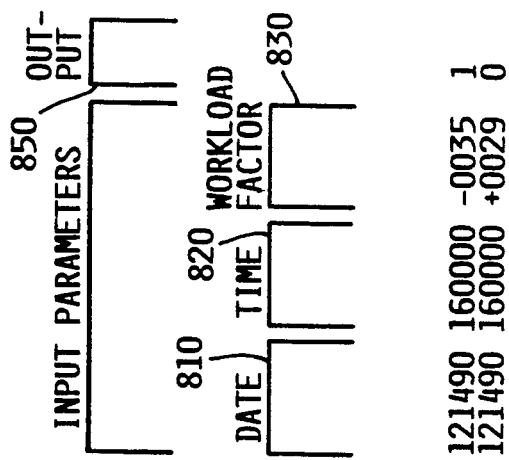
FIGS. 10A-10B show examples of numeric training data used in the preferred and alternate embodiments of the invention.
Figure 10A:
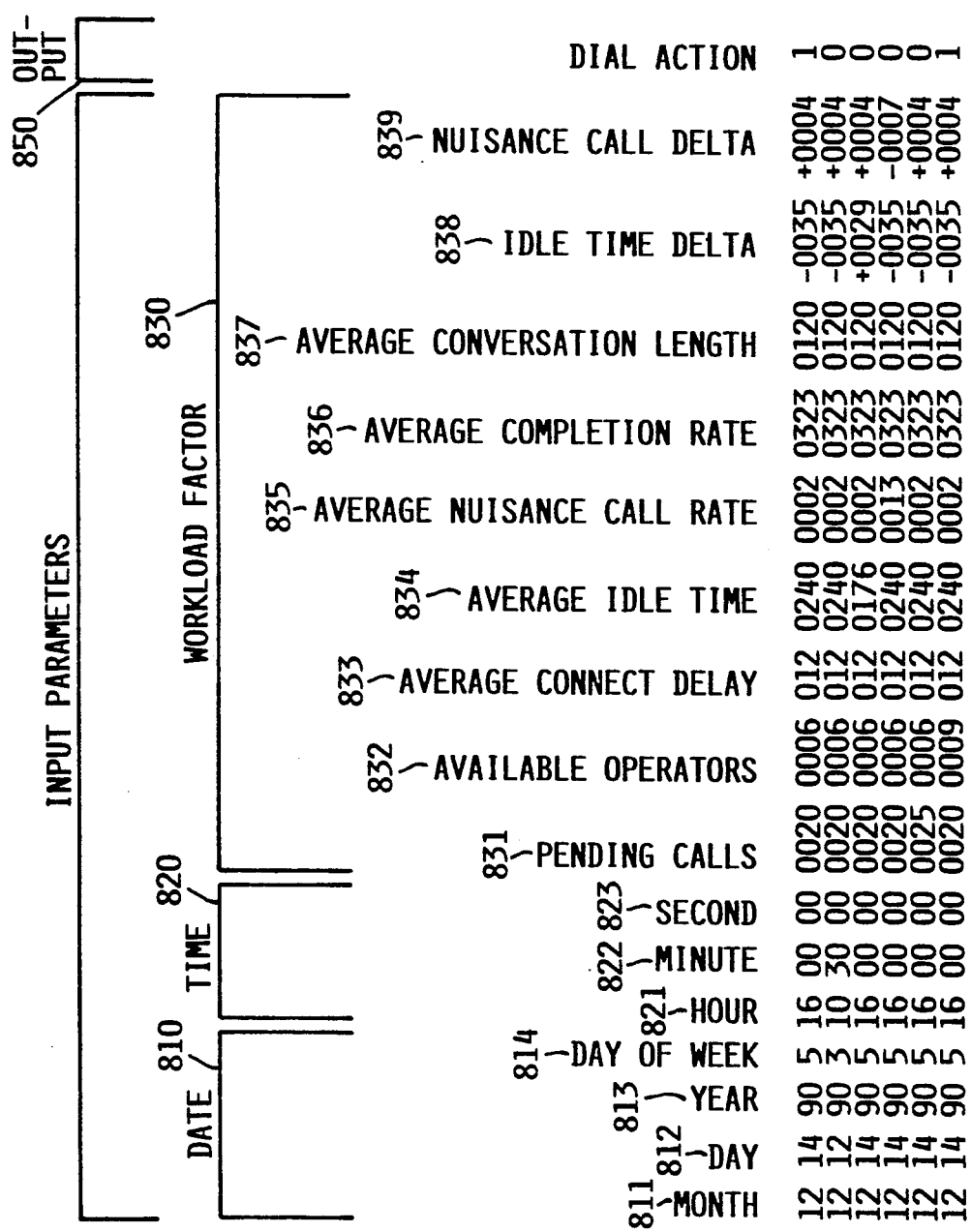

FIG. 10A shows the initial training data used in the preferred embodiment. Initial training data can be generated manually taking into account known and estimated conditions in a predictive dialing environment. For example, the first two records of training data indicates that calls after 4:00 PM on Fridays have a lower completion rate than calls at 10:30 AM on Wednesdays. Therefore, with all other workload factors being even, the neural network may learn that it should make a call at 4:00 PM on Friday, but shouldn't make the call at 10:30 AM on Wednesday, since the desired nuisance rate might be exceeded. The third record indicates that a call shouldn't be made because the average idle time is too low. The fourth record indicates that a call shouldn't be made because the average nuisance call rate is too high. The fifth record indicates that a call shouldn't be made because the number of calls pending is too high. The sixth record indicates that a call should be made because the number of available operators is sufficiently high.

Input parameters 811-814 make up date parameter 810. Input parameters 821-823 make up time parameter 820. In the preferred embodiment, time parameter 820 takes into account the time zone of the called party. Input parameters 831-838 make up workload factor parameter 830. In an alternate embodiment shown in FIG. 10B, date parameter 810 consists of a single input parameter. Time parameter 820 consists of a single input parameter. Workload factor parameter 830 consists of a single input parameter. Workload factor parameter 830 could be selected to be whatever the application developer considers to be the most important parameter, such as idle time delta or nuisance call delta. Output parameter 850 is not needed if only records where a call was made are stored.

Block 404 determines that the data set exists, so block 405 prompts the user for the name of the custom interface program, if any. If symbolic data is stored in the data set, a user specified custom interface program is needed to convert symbolic data (that humans understand) into numeric data (that neural networks understand). A custom interface program may also be used to normalize input data to give all data a range between 0 and 1, if desired. In our network, a custom interface program was specified in FIG. 13, and this program normalizes all data in a conventional matter for computational efficiency. Block 420 calls the Run Model Teach Program Subroutine for this model of FIG. 8B. The Model Teach Program was prepared by the Build Model Teach Program Subroutine of FIG. 6C, as has been discussed.

Referring now to FIG. 8B, block 433 performs the initialization routine built by blocks 231, 232 and 233 of FIG. 6C. Block 421 checks to see if a custom interface program was specified. If so, block 422 gets the data from the custom interface program. Otherwise, block 423 gets the data directly from the data set. Block 424 performs one teach step by running the neural network model-dependent routine provided by block 234 of FIG. 6C. In our example, the values of the data in the data arrays in body 90 are adjusted to minimize the error between the desired and actual network outputs. Block 425 again checks for a custom interface program. If it exists, block 426 checks to see if the user wants the values of the data in the data structure to be displayed. If so, a custom screen generated by the custom interface program is displayed in block 427. An example custom screen is shown in FIG. 17. If no custom interface program exists but the user wants data displayed, a default screen is displayed in block 428. An example default screen is shown in FIG. 15.

Referring again to FIG. 8B, block 429 checks to see if the user wanted the data logged. If so, block 430 performs custom or default logging of data. In either event, block 434 checks to see if one epoch has been completed. An epoch is complete when all training data in the data set has been processed once. If not, control loops back to block 421 to get the next training data. If one epoch has been completed, block 435 performs the end of epoch processing routine built by block 235 in FIG. 6C. In our example, the end of epoch processing routine determines if the difference between the actual and desired output for our output unit (call action) for all training data is less than the specified tolerance (one of the training parameters in field 74). If so, it sets the network status in field 68 to "locked". When the status of the neural network is "locked" the values of the data arrays are not permitted to change.

Block 431 then checks to see if the number of iterations specified by the user has been completed. Until this happens, block 431 is answered negatively and flow returns back to block 421 to perform another iteration through the training data. When the training period is complete, block 431 is answered positively. The subroutine returns in block 439 to block 407 of FIG. 8A. Block 407 returns to block 140 of FIG. 5.

Since our user wants to run his newly trained neural network to perform predictive dialing, he answers block 140 affirmatively in FIG. 5, thereby calling the Run Neural Network Subroutine in block 500 (FIG. 9). Alternatively, predictive dialing application program 41 (FIG. 3B) can call the Run Neural Network Subroutine directly, thereby bypassing FIG. 5.

Figure 9A:
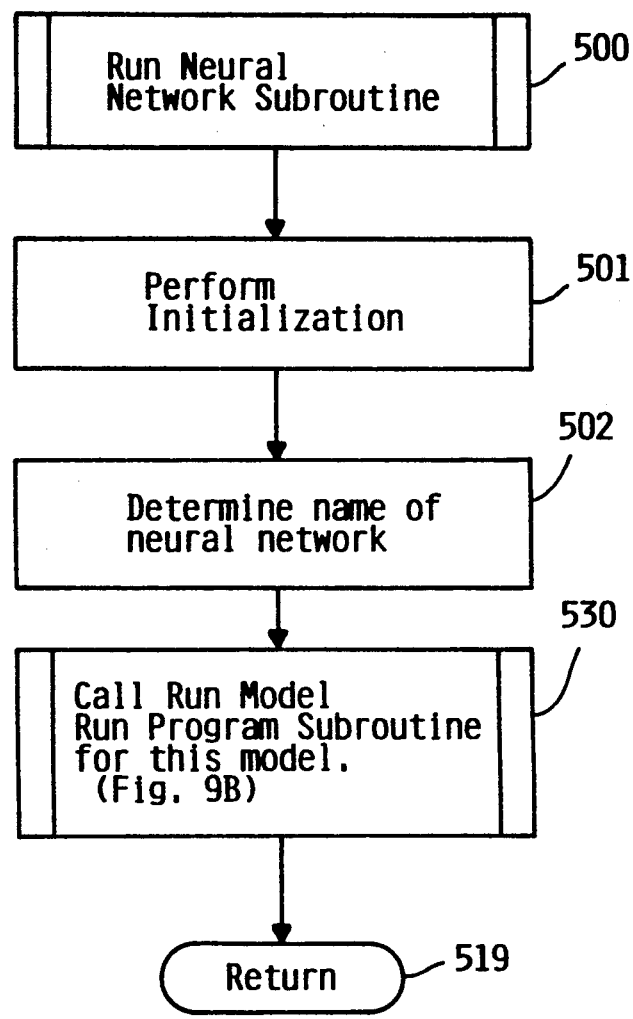

Referring now to FIG. 9A, block 501 performs the initialization routine built by blocks 251 and 252 of FIG. 6D. Block 502 determines the name of the neural network. Block 530 calls the Run Model Run Program Subroutine for this model of FIG. 9B. The Model Run Program was prepared by Build Model Run Program Subroutine of FIG. 6D, as has been discussed.

Figure 9B:
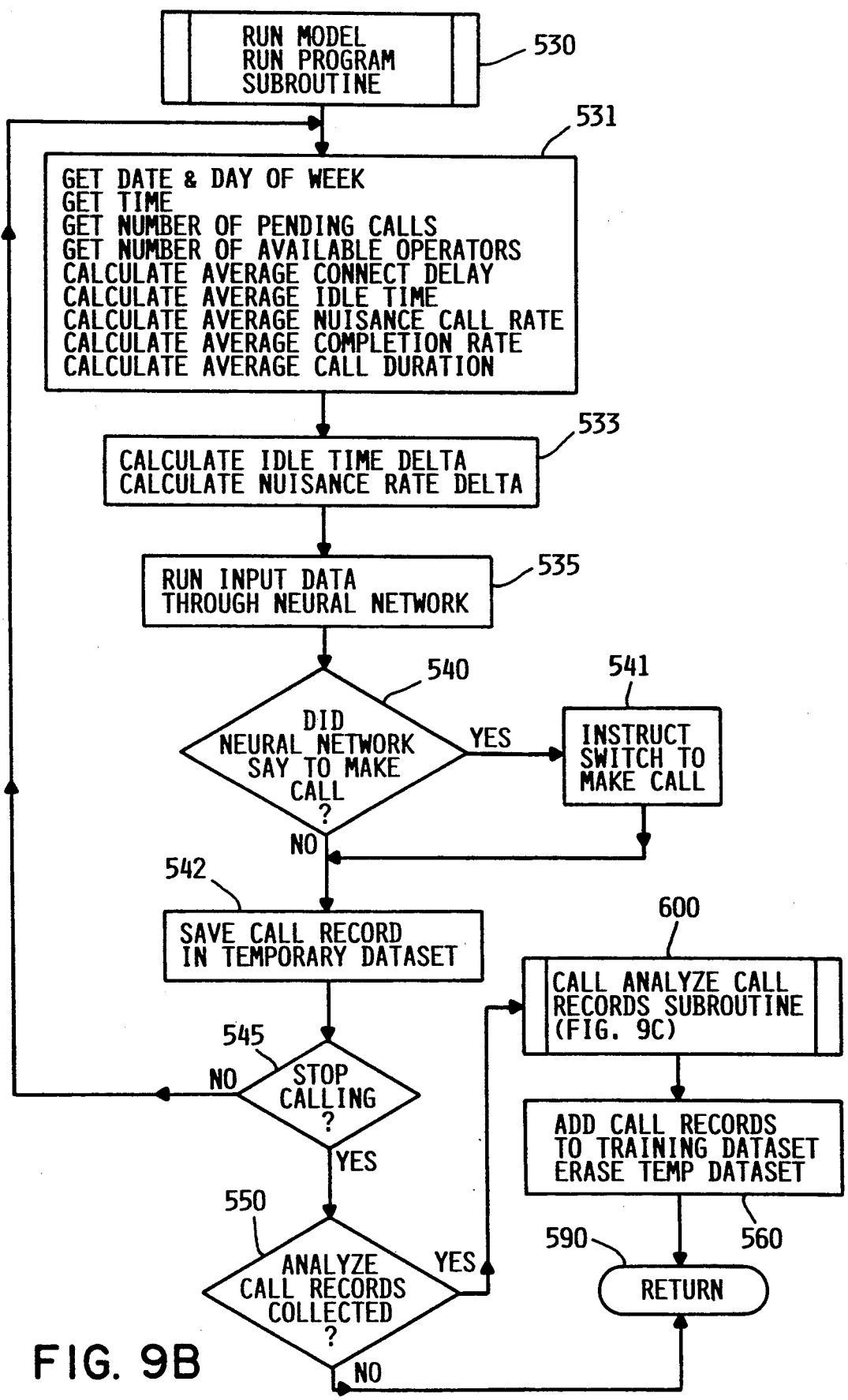

Referring now to FIG. 9B, block 531 gets the date, time, day of week, number of pending calls, and number of available operators from the system. It then calculates the average connect delay, the average completion rate, the average idle time, the average nuisance call rate, the average completion rate and the average conversation length. Although these averages can be calculated any number of ways, a preferred way is to keep a running count of the last 5 minutes of activity and determine the various averages over this time period. Block 533 calculates an idle time delta and a nuisance call delta. Idle time delta is the seconds per hour difference between a desired idle time (a variable entered into the computer system by the user) and the actual idle time. For example, if 205 seconds per hour is the desired idle time, and if the actual idle time is 240 seconds, the idle time delta would be $-35$ seconds $(205-240=-35)$. The nuisance call delta is desired percentage of nuisance calls minus actual percentage of nuisance calls. For example, if desired nuisance calls percentage is 0.64% and actual nuisance calls percentage is 0.2%, the nuisance call delta is $+0.4\%$ $(0.6\%-0.2\%=0.4\%)$. The first record of FIG. 10A shows an idle time delta of $-35$ seconds and a nuisance call delta of 0.4%. The input data of blocks 531 and 533 are considered to be a "current call record".

The desired idle time and desired percentage of nuisance calls are design choices and can vary based on the particular application. A 300 second to 600 second idle time per hour (5-10 minutes) may be desirable to minimize operator fatigue yet also avoid operator boredom and low productivity. It is normally desirable to keep the nuisance call percentage as close to 0% as possible to minimize customer annoyance with being contacted by a computer when no operator is available.

The data used in blocks 531 and 533 is normally determined from information retrieved from telephony enabler 20. In the preferred embodiment, this information is retrieved from the CallPath/400 telephony enabler by using a series of commands supported by the CallPath/400 Application Programming Interface. This interface is described in more detail in IBM document GC21-9867, CallPath/400 Programmer's Reference, attached hereto as Appendix II. Some of the specific commands that can be used by those skilled in the art are Make_Call, Receive, Add_Party, and Disconnect. These commands return the information needed to determine the data used in blocks 531 and 533 in the form of the following events: Call_Alerting, Call_Connected, Call_Rejected, Disconnected, (and associated timestamp information included with the above events). The Feature_Invoked event is also used in determining status of operators or agents.

Block 535 runs all the input data contained in the current call record through the trained neural network. When the neural network was trained, it determined a relationship between input data contained in call records with a call action (make or don't make the call). Based on this relationship, the neural network looks at the input data in the current call record and, in the preferred embodiment, passes a numeric value between 0 and 1 to predictive dialing application program 41 via line 44 (FIG. 3B). The closer this numeric value is to 1, the more confident the neural network is that a call should be made. Predictive dialing application program 41, in the preferred embodiment, gets a threshold value of 0.5, although this could be larger or smaller. Therefore, a numeric value of 0.5 or greater from the neural network indicates that a call should be made, while a numeric value less than 0.5 indicates that a call should not be made.

Block 540 asks if the neural network indicated that a call should be made. If so, block 541 instructs the switch to make the call. In the preferred embodiment, this is done by informing telephony enabler 20, that a call should be made. Telephony enabler 20 handles the communications protocol with the switch necessary to make calls.

Block 542 saves the current call record in a temporary dataset for future analysis, as will be discussed later. In the preferred embodiment, block 542 appends the call action onto the call record and saves all call records, whether the call was made or not. An alternate embodiment is contemplated where the call action is not appended and only call records where a call was made is saved in block 542.

Block 545 checks to see if the application program wants to stop making calls. The application program may automatically stop making calls after a certain elapsed time, at a specific time of day, or if all the operators have gone home. If no such indication to stop making calls is received, flow of control loops back to block 531 where new input data is retrieved. If an indication to stop making calls is received, block 550 asks if the call records saved through various iterations of block 542 should be analyzed to see if the neural network needs further training. If analysis is not desirable, the subroutine returns in block 590 to block 519 to block 190 in FIG. 5, where the program ends, or, alternatively, returns to predictive dialing application program 41 that called it for further processing.

Figure 9C:
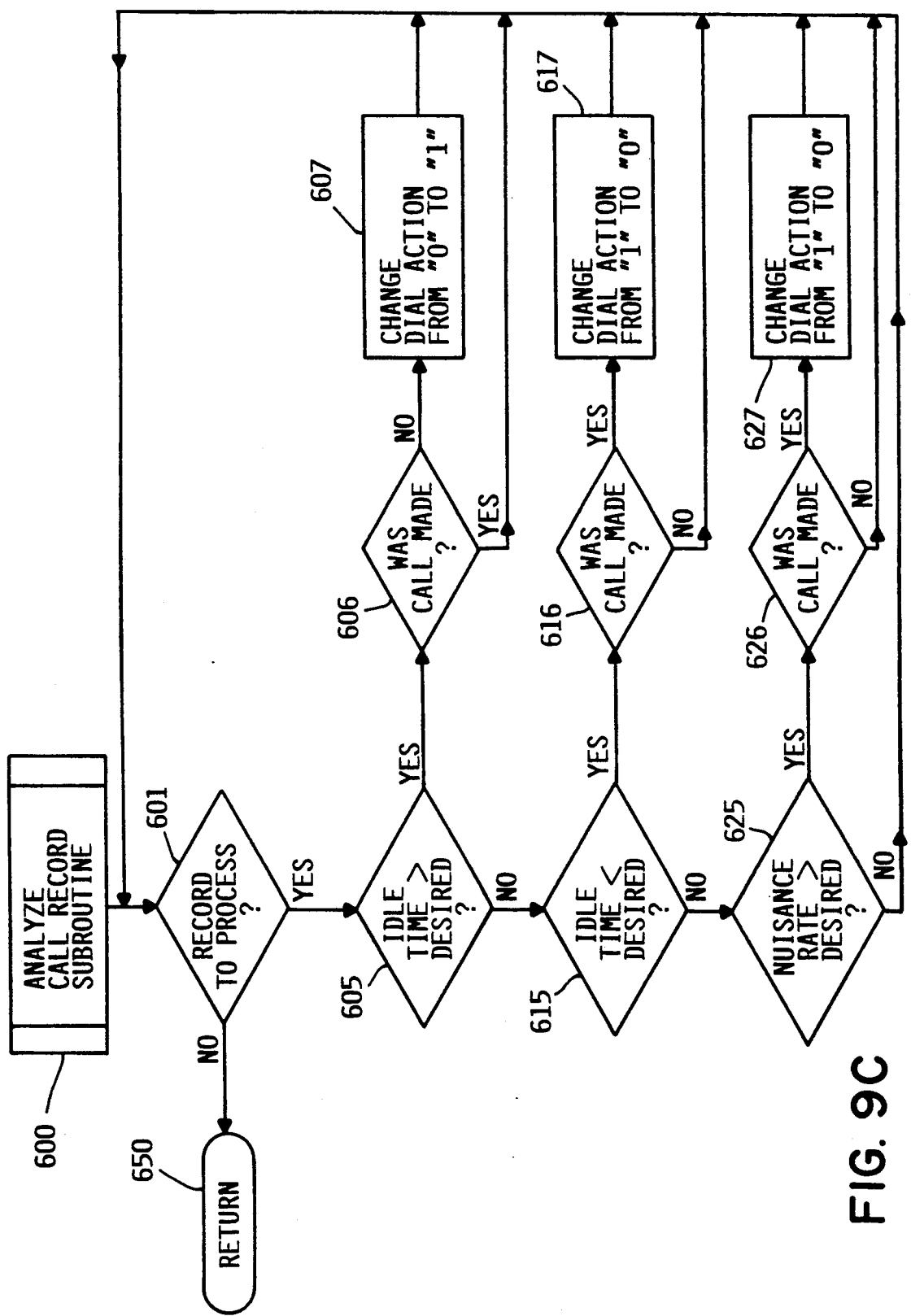

If block 550 is answered affirmatively, Analyze Call Records Subroutine 600 of FIG. 9C is called. Referring now to FIG. 9C, block 601 asks if there is a call record to process. If so, block 605 asks if the average idle time is greater than desired. If so, block 606 asks if a call was made. A call should have been made if the idle time is greater than desired, since operators are sitting around waiting for something to do. If block 606 indicates that a call was not made, the neural network made the "wrong" decision in this case. Block 607 changes the Dial Action field in the call record from a "0" (indicating that a call wasn't made) to a "1" (indicating that a call was made). This change is done to make the call record reflect the desired result so that the neural network can learn from it later. If block 606 indicates that a call was made, the neural network made the right decision. In either event, flow returns back to block 601 to look for another record to process.

If block 605 was answered negatively, block 615 asks if the average idle time is less than desired. If so, block 616 asks if a call was made. A call should not have been made if the idle time is less than desired, since operators are overworked. If block 616 indicates that a call was made, the neural network made the "wrong" decision in this case. Block 617 changes the Dial Action field in the call record from a "1" (indicating that a call was made) to a "0" (indicating that a call wasn't made). As before, this change is done to make the call record reflect the desired result so that the neural network can learn from it later. If block 616 indicates that a call was not made, the neural network made the right decision. In either event, flow returns back to block 601 to look for another record to process.

If block 615 was answered negatively, block 625 asks if the average nuisance call rate is greater than desired. If so, block 626 asks if a call was made. A call should not have been made if the nuisance call rate is greater than desired, since it will be likely that there will be no operators available to take the call. If block 626 indicates that a call was made, the neural network made the "wrong" decision in this case. Block 627 changes the Dial Action field in the call record from a "1" (indicating that a call was made) to a "0" (indicating that a call wasn't made). As before, this change is done to make the call record reflect the desired result so that the neural network can learn from it later. If block 626 indicates that a call was not made, the neural network made the right decision. In either event, flow returns back to block 601 to look for another record to process.

When block 601 indicates that there are no more call records to process, the subroutine returns in block 650 to block 560 in FIG. 9B. Block 560 adds the call records (some of which may have been changed by subroutine 600) to the training dataset. The temporary dataset is then erased. By putting these records into the training dataset, the neural network can be retrained by restarting the flowchart of FIG. 5 and indicating that the network is to be trained. In this manner, the neural network can improve its learning process and make fewer and fewer mistakes in the future. After a few of these learning iterations, the neural network should be able to consistently stay within the desired idle rate and nuisance call percentage parameters and be able to look ahead and anticipate changes in calling patterns and adjust accordingly, before the nuisance call rate or operator idle time reach unacceptable levels.

While this invention has been described with respect to the preferred embodiment, it will be understood by those skilled in the art that various changes in detail may be made therein without departing from the spirit, scope and teaching of the invention. For example, the input parameters selected could be quite different from those in the preferred embodiment. Economic factors such as unemployment rate or gross national product may be added; other factors such as current weather conditions may also be added. In addition, the desired idle time or the desired nuisance call percentage can be larger or smaller than the exemplary values shown herein. Although a neural network is used in the preferred embodiment, the relationship between a selected group of input parameters and the desired output can be determined through an expert system or other programming or logical circuitry. Accordingly, the herein disclosed is to be limited only as specified in the following claims.

What is claimed is:

1. A look-ahead method for predictive dialing, comprising the steps of:
   storing a first call record, said first call record comprising a first group of input parameters, said first group of input parameters comprising a first date, a first time of day, and a first workload factor;
   storing a second call record, said second call record comprising a second group of input parameters, said second group of input parameters comprising a second date, a second time of day, and a second workload factor; and
   learning from said first call record and said second call record a relationship between said first and second groups of input parameters and a plurality of dial actions.

2. The method of claim 1, further comprising the step of:
   creating a current call record containing a current date, a current time, and a current workload factor.

3. The method of claim 2, further comprising the step of:
   determining whether a call should be initiated at said current time, said current date, and said current workload factor based on said relationship learned by said learning step.

4. The method of claim 3, further comprising the step of:
   initiating a call if said relationship between said group of input parameters and said plurality of dial actions indicates that said call should be initiated at said current time said current date, and said current workload factor.

5. The method of claim 4, further comprising the step of:
   storing said current call record along with said first call record and said second call record.

6. A look-ahead method for predictive dialing, comprising the steps of:
   storing a first call record, said first call record comprising a first group of input parameters and a first dial action, said input parameters comprising a first date, a first time of day, and a first workload factor;
   storing a second call record, said second call record comprising a second group of input parameters and a second dial action, said input parameters comprising a second date, a second time of day, and a second workload factor; and
   learning from said first call record and said second call record a relationship between said first and second groups of input parameters and said first and second dial actions.

7. The method of claim 6, further comprising the step of:
   creating a current call record containing a current data, a current time, and a current workload factor.

8. The method of claim 7, further comprising the step of:
   determining whether a call should be initiated at said current time, said current data, and said current workload factor based on said relationship learned by said learning step.

9. The method of claim 8, further comprising the step of:
   initiating a call if said relationship between said group of input parameters and said dial actions indicates that said call should be initiated at said current time, said current date, and said current workload factor.

10. The method of claim 8, further comprising the steps of:
    appending a current dial action onto said current call record, said current dial action responsive to said determining step; and
    storing said current call record along with said first call record and said second call record.

11. A look-ahead method for predictive dialing using a neural network, comprising the steps of:
    storing a first call record, said first call record comprising a first group of input parameters, said first group of input parameters comprising a first date, a first time of day, and a first workload factor;
    storing a second call record, said second call record comprising a second group of input parameters, said second group of input parameters comprising a second date, a second time of day, and a second workload factor; and
    said neutral network learning from said first call record and said second call record a relationship between said first and second groups of input parameters and a plurality of dial actions.

12. The method of claim 11, further comprising the step of:
    creating a current call record containing a current date, a current time, and a current workload factor.

13. The method of claim 12, further comprising the step of:
    said neural network determining whether a call should be initiated at said current time, said current date, and said current workload factor based on said relationship between said group of input parameters and said dial actions learned by said learning step from said stored plurality of call records.

14. The method of claim 13, further comprising the step of:
    initiating a call if said relationship between said group of input parameters and said dial actions indicates that said call should be initiated at said current time, said current date, and said current workload factor.

15. The method of claim 13, further comprising the steps of:
    appending a current dial action onto said current call record, said current dial action responsive to said determining step; and
    storing said current call record along with said first call record and said second call record.

16. The method of claim 15, further comprising the steps of:
    analyzing said first, said second, and said current call records to determine if a correct dial action was made;
    changing said dial action to said correct dial action if said correct dial action was not made.

17. The method of claim 16, further the step of:

the neural network re-learning from said first, said second, and said current call records a relationship between said group of input parameters and said dial actions.

18. A computer system for predictive dialing, comprising:
   means for storing a first call record, said first call record comprising a first group of input parameters and a first dial action, said input parameters comprising a first data, a first time of day, and a first workload factor;
   means for storing a second call record, said second call record comprising a second group of input parameters and a second dial action, said input parameters comprising a second data, a second time of day, and a second workload factor; and
   means for learning from said first call record and said second call record a relationship between said first and second groups of input parameters and said first and second dial actions.

19. The computer system of claim 18, further comprising:
   means for creating a current call record containing a current date, a current time, and a current workload factor.

20. The computer system of claim 19, further comprising:
   means for determining whether a call should be initiated at said current time, said current date, and said current workload factor based on said relationship learned by said learning step.

21. The computer system of claim 20, further comprising:
   means for initiating a call if said relationship between said group of input parameters and said dial actions indicates that said call should be initiated at said current time, said current date, and said current workload factor.

22. The computer system of claim 20, further comprising:
   means for appending a current dial action onto said current call record, said current dial action responsive to said determining step; and
   means for storing said current call record along with said first call record and said second call record.

23. The computer system of claim 22, further comprising:
   means for analyzing said first, said second, and said current call records to determine if a correct dial action was made;
   means for changing said dial action to said correct dial action if said current dial action was not made.

24. The computer system of claim 23, further comprising:
   the neural network re-learning from said first, said second, and said current call records a relationship between said group of input parameters and said dial actions.

25. A program product for predictive dialing, comprising:
   a first call record, said first call record comprising a first group of input parameters and a first dial action, said input parameters comprising a first date, a first time of day, and a first workload factor;
   a second call record, said second call record comprising a second group of input parameters and a second dial action, said input parameters comprising a second date, a second time of day, and a second workload factor; and
   means for learning from said first call record and said second call record a relationship between said first and second groups of input parameters and said first and second dial actions.

26. The program product of claim 25, further comprising:
   means for creating a current call record containing a current date, a current time, and a current workload factor.

27. The program product of claim 26, further comprising:
   means for determining whether a call should be initiated at said current time, said current date, and said current workload factor based on said relationship learned by said learning step.

28. The program product of claim 27, further comprising:
   means for initiating a call if said relationship between said group of input parameters and said dial actions indicates that said call should be initiated at said current time, said current date, and said current workload factor.

29. The program product of claim 27, further comprising:
   means for appending a current dial action onto said current call record, said current dial action responsive to said determining step; and
   means for storing said current call record along with said first call record and said second call record.

30. The program product of claim 29, further comprising:
   means for analyzing said first, said second, and said current call records to determine is a correct dial action was made;
   means for changing said dial action to said correct dial action if said correct dial action was not made.

31. The program product of claim 30, further comprising:
   means for the neural network re-learning from said first, said second, and said current call records a relationship between said group of input parameters and said dial actions.

32. A predictive dialing system, comprising:
   a computer system having a processor and storage;
   a telephone switch connected top said computer;
   said computer system further comprising:
   means for storing a first call record each said first call record comprising a first group of input parameters and a first dial action, said input parameters comprising a first date, a first time of day, and a first workload factor;
   means for storing a second call record, said second call record comprising a second group of input parameters and a second dial action, said input parameters comprising a second date, a second time of day, and a second workload factor; and
   means for learning from said first call record and said second call record a relationship between said first and second groups of input parameters and said first and second dial actions.
   means for creating a current call record containing a current data, a current time, and a current workload factor;
   means for determining whether a call should be initiated at said current time, said current date, and said current workload factor based on said relationship learned by said learning step; and means for instructing said telephone switch to connect an operator telephone with an external telephone if said relationship between said group of input parameters and said dial actions indicates that said connection should be initiated at said current time, said current date, and said current workload factor.

33. The predictive dialing system of claim 32, further comprising:

means for appending a current dial action onto said current call record, said current dial action responsive to said determining step; and means for storing said current call record along with said first call record and said second call record.

34. A predictive dialing system, comprising:
a computer system, comprising:
a processor;
storage;
a neural network;
a telephone switch connected to said computer;
said neural network further comprising:
means for storing a first call record, said first call record comprising a first group of input parameters and a first dial action, said input parameters comprising a first data, a first time of day, and a first workload factor;

means for storing a second call record, said second call record comprising a second group of input parameters and a second dial action, said input parameters comprising a second date, a second time of day, and a second workload factor; and means for learning from said first call record and said second call record a relationship between said first and second groups of input parameters and said first and second dial actions, means for creating a current call record containing a current date, a current time, and a current workload factor;

means for determining whether a call should be initiated at said current time, said current date, and said current workload factor based on said relationship learned by said learning step; and means for instructing said telephone switch to connect an operator telephone with an external telephone if said relationship between said group of input parameters and said dial actions indicates that said connection should be initiated at said current time, said current date, and said current workload factor;

35. The predictive dialing system of claim 34, further comprising:

means for appending a current dial action onto said current call record, said current dial action responsive to said determining step; and means for storing said current call record along with said first call record and said second call record.

* * * * *